US011420525B2

(12) United States Patent
Maiorana

(10) Patent No.: US 11,420,525 B2
(45) Date of Patent: Aug. 23, 2022

(54) TRACTOR TRAILER WITH INCLUDED BATTERY CHARGING

(71) Applicant: Mac LTT, Inc., Kent, OH (US)

(72) Inventor: James A. Maiorana, Hartville, OH (US)

(73) Assignee: MAC LTT, INC., Kent, OH (US)

( * ) Notice: Subject to any disclaimer, the term of this patent is extended or adjusted under 35 U.S.C. 154(b) by 0 days.

(21) Appl. No.: 17/144,601

(22) Filed: Jan. 8, 2021

(65) Prior Publication Data

US 2021/0323422 A1 Oct. 21, 2021

Related U.S. Application Data

(60) Provisional application No. 63/013,324, filed on Apr. 21, 2020.

(51) Int. Cl.
*B60L 53/16* (2019.01)
*B60L 53/30* (2019.01)
*B60L 53/65* (2019.01)
*B60L 53/36* (2019.01)

(52) U.S. Cl.
CPC ............. *B60L 53/16* (2019.02); *B60L 53/305* (2019.02); *B60L 53/36* (2019.02); *B60L 53/65* (2019.02)

(58) Field of Classification Search
CPC .......... B60L 53/16; B60L 53/305; B60Q 1/36
USPC ........................................................ 320/109
See application file for complete search history.

(56) References Cited

U.S. PATENT DOCUMENTS

| 1,365,110 | A | | 1/1921 | Kramer |
| 2,989,213 | A | | 6/1961 | Daggit |
| 3,788,268 | A | | 1/1974 | Hiatt et al. |
| 4,311,208 | A | | 1/1982 | Macrorie et al. |
| 4,371,056 | A | | 2/1983 | Anglade |
| 4,679,657 | A | | 7/1987 | Bennett et al. |
| 4,697,541 | A | | 10/1987 | Wicker |
| 4,825,192 | A | | 4/1989 | Wells |
| 4,848,517 | A | | 7/1989 | Broyles |
| 5,497,304 | A | | 3/1996 | Caine |
| 5,678,984 | A | * | 10/1997 | Petersen .................. B60P 1/43 296/61 |
| 5,847,642 | A | | 12/1998 | Esposito et al. |
| 5,878,676 | A | | 3/1999 | Etling et al. |
| 5,878,767 | A | | 3/1999 | Etling et al. |
| 5,907,284 | A | | 5/1999 | Israel |
| 5,971,105 | A | | 10/1999 | Jacobson |
| 6,092,911 | A | * | 7/2000 | Baker, III .............. A62C 27/00 169/24 |
| 6,118,372 | A | | 9/2000 | Leow |
| 6,213,047 | B1 | | 4/2001 | Means et al. |
| 6,431,093 | B1 | | 8/2002 | Hansen |
| 6,739,349 | B2 | | 5/2004 | Kastenschmidt et al. |
| 6,785,991 | B2 | | 9/2004 | Colip |

(Continued)

FOREIGN PATENT DOCUMENTS

EP 2902565 8/2015

*Primary Examiner* — Suchin Parihar
(74) *Attorney, Agent, or Firm* — Sand, Sebolt & Wernow Co., LPA

(57) ABSTRACT

A vehicle includes a charging dock carried by the vehicle, a safety arm carried by the vehicle, a battery carried by the safety arm, and a light source on the safety arm that is in electrical communication with the battery. The battery is in electrical communication with the charging dock and the charging dock charges the battery.

19 Claims, 28 Drawing Sheets

(56) References Cited

U.S. PATENT DOCUMENTS

| | | | |
|---|---|---|---|
| 6,921,184 B2 | 7/2005 | Tufte | |
| 6,966,403 B1 | 11/2005 | Chandra | |
| 7,174,994 B1 | 2/2007 | Coffield et al. | |
| 7,370,602 B2 | 5/2008 | Greves | |
| 7,690,858 B1 | 4/2010 | Chiavola | |
| 7,841,269 B1 | 11/2010 | Jacobs | |
| 3,075,169 A1 | 12/2011 | Englander | |
| 8,118,250 B1 | 2/2012 | Helseth et al. | |
| 8,232,888 B2 | 7/2012 | Frederick et al. | |
| 8,316,910 B2 | 11/2012 | Popa et al. | |
| 8,371,742 B2 | 2/2013 | Doron et al. | |
| 8,552,852 B1* | 10/2013 | Hertz | B60Q 7/02 340/471 |
| 8,610,598 B2 | 12/2013 | Hider et al. | |
| 8,616,721 B1 | 12/2013 | Woodall, Jr. et al. | |
| RE44,787 E | 3/2014 | Burgess | |
| 8,698,610 B2 | 4/2014 | Krugh, IV | |
| 8,698,612 B2 | 4/2014 | Toll | |
| 8,740,267 B1 | 6/2014 | Wilson | |
| 8,770,778 B2 | 7/2014 | Pereira et al. | |
| 9,006,172 B2 | 4/2015 | Cott, Sr. et al. | |
| 9,437,109 B1* | 9/2016 | Stafford | B60Q 7/00 |
| 9,442,194 B2 | 9/2016 | Kurihara et al. | |
| 9,694,883 B1 | 7/2017 | Bonventre | |
| 9,745,706 B2 | 8/2017 | Baban et al. | |
| 10,836,306 B1* | 11/2020 | Dubey | B60Q 1/50 |
| 2004/0173406 A1 | 9/2004 | Lantz | |
| 2005/0173189 A1 | 8/2005 | Berardi | |
| 2008/0179908 A1 | 7/2008 | Haber et al. | |
| 2010/0018800 A1 | 1/2010 | Ventura et al. | |
| 2010/0118557 A1 | 5/2010 | Ortwein et al. | |
| 2010/0224444 A1 | 9/2010 | Simeonov et al. | |
| 2011/0148645 A1 | 6/2011 | Samiento | |
| 2011/0202161 A1 | 8/2011 | Krieger et al. | |
| 2013/0140111 A1 | 6/2013 | Desai | |
| 2013/0146494 A1 | 6/2013 | Gilpatrick | |
| 2013/0235558 A1 | 9/2013 | Zhou | |
| 2013/0265784 A1 | 10/2013 | Nieberle | |
| 2013/0313978 A1 | 11/2013 | Fields et al. | |
| 2014/0041964 A1 | 2/2014 | Bedyk | |
| 2014/0056013 A1 | 2/2014 | Hancock, Jr. et al. | |
| 2014/0353081 A1 | 12/2014 | Linch et al. | |
| 2015/0075908 A1 | 3/2015 | Moss et al. | |
| 2015/0203026 A1* | 7/2015 | Schotanus | B60Q 1/326 362/520 |
| 2015/0241034 A1 | 8/2015 | Dankelmann et al. | |
| 2016/0230461 A1 | 8/2016 | Finegan | |
| 2016/0273744 A1 | 9/2016 | Stout | |
| 2016/0281885 A1 | 9/2016 | Shearer et al. | |
| 2016/0305619 A1 | 10/2016 | Howe | |
| 2016/0347247 A1 | 12/2016 | Espey et al. | |
| 2016/0360593 A1 | 12/2016 | Lee | |
| 2017/0036595 A1* | 2/2017 | Wright | B60Q 3/30 |
| 2017/0188439 A1 | 6/2017 | Martinez | |
| 2017/0232930 A1 | 8/2017 | Murar et al. | |
| 2017/0241203 A1 | 8/2017 | Elnore | |
| 2017/0068303 A1 | 9/2017 | Land et al. | |
| 2017/0283240 A1 | 10/2017 | Wruck et al. | |
| 2017/0291535 A1* | 10/2017 | Arcand | B60Q 1/36 |
| 2017/0314328 A1 | 11/2017 | Friedman | |
| 2017/0344097 A1 | 11/2017 | Land et al. | |
| 2017/0350584 A1 | 12/2017 | Hufet et al. | |
| 2018/0122218 A1 | 5/2018 | Shanley | |
| 2019/0178463 A1* | 6/2019 | Ashley | B60Q 1/46 |
| 2021/0053484 A1* | 2/2021 | Paton | B60Q 1/2692 |
| 2021/0107582 A1* | 4/2021 | Hillman | B60Q 1/1423 |
| 2021/0129932 A1* | 5/2021 | Keller | B62J 11/00 |
| 2021/0323464 A1* | 10/2021 | Maiorana | B60P 3/228 |
| 2021/0323493 A1* | 10/2021 | Maiorana | B60R 19/50 |

\* cited by examiner

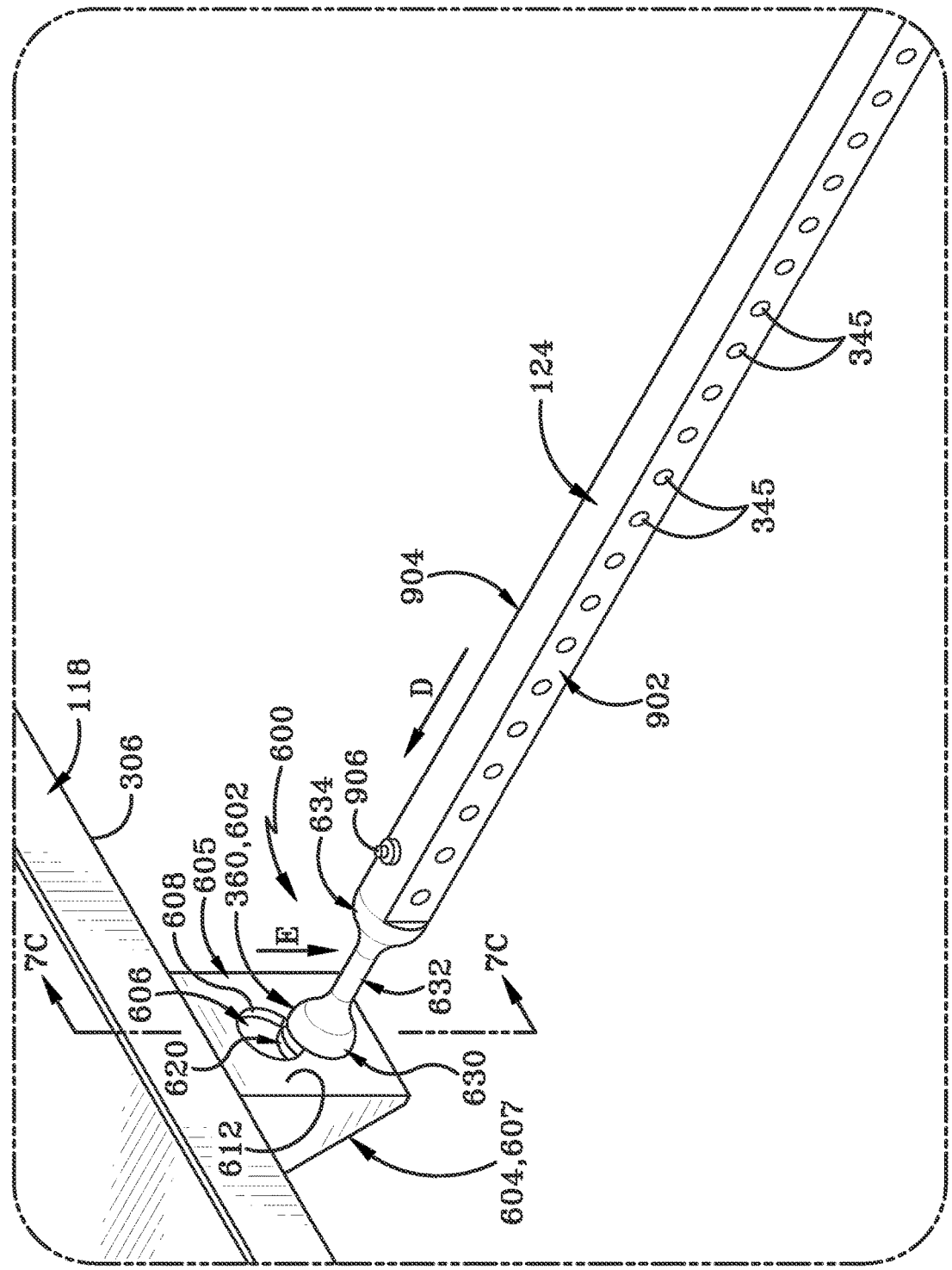

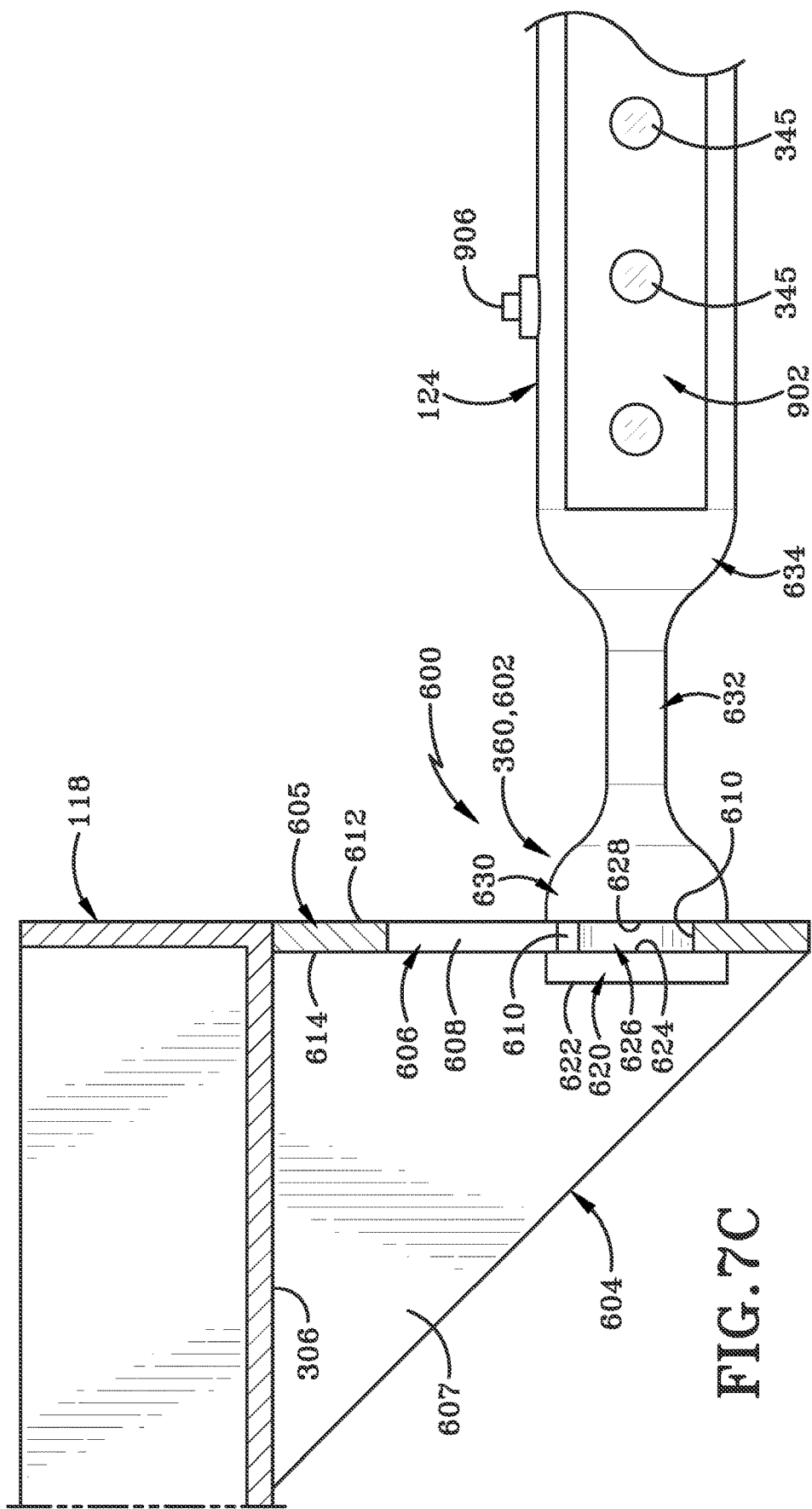

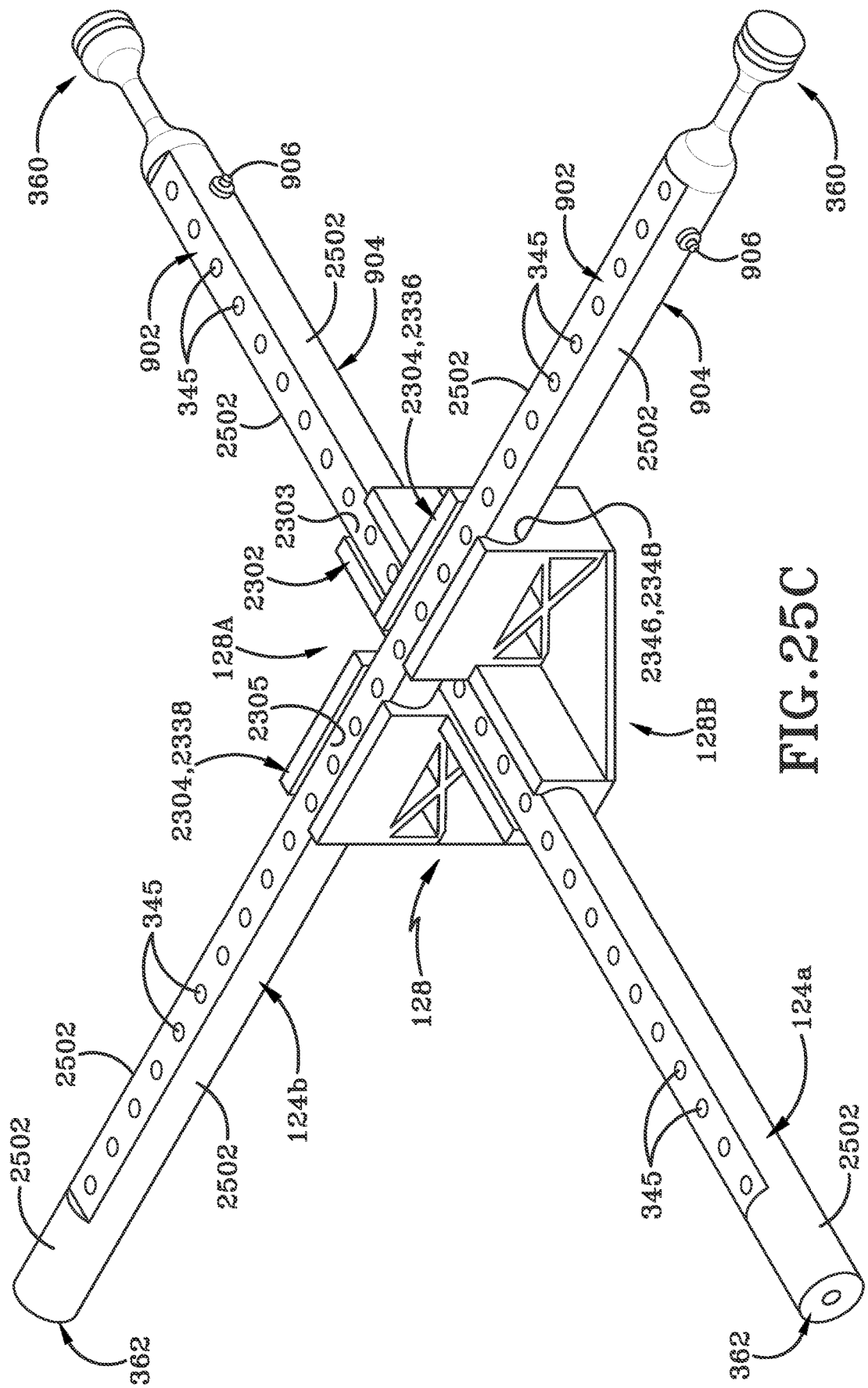

TRACTOR TRAILER WITH INCLUDED BATTERY CHARGING

CROSS REFERENCE TO RELATED APPLICATIONS

This application claims benefit of U.S. Provisional Application Ser. No. 63/013,324, filed on Apr. 21, 2020, the entire disclosure of which is incorporated herein by reference.

TECHNICAL FIELD

The present disclosure relates generally to vehicles. More specifically, the present disclosure relates to safety systems for use with a vehicle. More specifically, the present disclosure relates to deployable safety arms for use with a vehicle.

BACKGROUND

Cargo carrying vehicles, including tanker trucks, must stop at various destinations in order to unload their cargo. Typically, after arriving at a destination, a driver must exit the cab of the truck in order to begin the unloading process. During the unloading process, the driver typically stands next to the truck. Often, the unloading process is at a high traffic location, like a gas station. As a result, when the driver is at risk of being struck by another vehicle while unloading cargo. Furthermore, the unloading process may be performed at night when the driver may be less visible to other drivers. The unloading process may require the driver's full attention, making the driver unaware of potential hazards.

SUMMARY

Currently, truck drivers must leave their vehicle to perform tasks that may divert their attention away from their surroundings. These tasks may be performed in high traffic areas putting the driver at risk from being struck by another vehicle. Thus, there is a continuous need for safety systems that protect drivers outside of their vehicle. In order to address this continuous need, the present disclosure provides safety arms for protecting drivers outside of their vehicle. As such, aspects of the present disclosure relate to safety arms for use with a vehicle.

In one aspect, an exemplary embodiment of the present disclosure may further provide a vehicle. The vehicle may include a charging dock carried by the vehicle. The vehicle may further include a first safety arm carried by the vehicle. The vehicle may further include a first battery carried by the first safety arm. The first battery may be in electrical communication with the charging dock. The charging dock may charge the first battery. The vehicle may further include a first light source on the first safety arm. The first light source may be in electrical communication with the first battery. This embodiment or another exemplary embodiment may further provide wherein the charging dock charges the first battery while the vehicle is moving. This embodiment or another exemplary embodiment may further provide a power source in electrical communication with the charging dock, wherein the power source charges the first battery. This embodiment or another exemplary embodiment may further provide wherein the charging dock receives a portion of the first safety arm. This embodiment or another exemplary embodiment may further provide wherein the charging dock includes a charging connector and the first safety arm includes a charging receptacle that is connected to an in electrical communication with the charging connector.

This embodiment or another exemplary embodiment may further provide a receiver connected to the vehicle; and a coupler on the first safety arm, wherein the coupler couples the first safety arm to the receiver. This embodiment or another exemplary embodiment may further provide a second safety arm carried by the vehicle; a second battery carried by the second safety arm and in electrical communication with the charging dock, wherein the charging dock charges the second battery; and a second light source on the second safety arm and in electrical communication with the second battery. This embodiment or another exemplary embodiment may further provide a first receiver connected to the vehicle; a second receiver connected to the vehicle; a first coupler on the first safety arm, wherein the first coupler couples the first safety arm to the first receiver; and a second coupler on the second safety arm, wherein the second coupler couples the second safety arm to the second receiver. This embodiment or another exemplary embodiment may further provide wherein the charging dock receives a portion of the first safety arm and a portion of the second safety arm simultaneously. This embodiment or another exemplary embodiment may further provide wherein the charging dock includes a first charging connector and a second charging connector, the first safety arm includes a first charging receptacle that is connected to and in electrical communication with the first charging connector, and the second safety arm includes a second charging receptacle that is connected to and in electrical communication with the second charging connector.

This embodiment or another exemplary embodiment may further provide wherein the charging dock charges the first battery and the second battery of the second safety arm simultaneously. This embodiment or another exemplary embodiment may further provide a trailer that carries the first safety arm, the second safety arm, and the charging dock; and a cab connected to the trailer. This embodiment or another exemplary embodiment may further provide a power source carried by the cab and in electrical communication with the charging dock, wherein the power source charges the first battery and the second battery. This embodiment or another exemplary embodiment may further provide an arm holder carried by the trailer and adjacent to the charging dock, wherein the arm holder carries the first safety arm and the second safety arm. This embodiment or another exemplary embodiment may further provide wherein the trailer is a cylindrical tank including a nozzle assembly and the arm holder is adjacent to the nozzle assembly.

In another aspect, an exemplary embodiment of the present disclosure may further provide a method for charging a battery of a safety arm. The method may include decoupling a first safety arm from a vehicle. The first safety arm may include a light source and a battery in electrical communication with the light source. The method may further include returning the first safety arm to a charging dock. The charging dock may be carried by the vehicle. The method may further include charging the battery with the charging dock. This embodiment or another exemplary embodiment may further provide removing the first safety arm from the charging dock; and coupling the first safety arm to the vehicle. This embodiment or another exemplary embodiment may further provide decoupling a second safety arm from the vehicle, wherein the second safety arm includes a light source and a battery in electrical communication with the light source; returning the second to the charging dock; and charging the battery of the second safety arm with the charging dock. This embodiment or another exemplary embodiment may further provide charging the battery of the first safety arm and the battery of the second safety arm with a power source carried by the vehicle. This embodiment or another exemplary embodiment may further provide moving the vehicle; and charging the battery of the first safety arm and charging the battery of the second safety arm simultaneously while the vehicle is moving.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 7B is an enlarged view of the safety arm coupled to the safety arm receiver depicted in FIG. 6.

FIG. 7C is cross sectional view of the safety arm coupled to the safety arm receiver depicted in FIG. 7B along the line 7C-7C.

FIG. 25C is a side view of the bracket depicted in FIG. 23 coupled to two safety arms.

Similar numbers refer to similar parts throughout the drawings.

DETAILED DESCRIPTION

Figure 1:
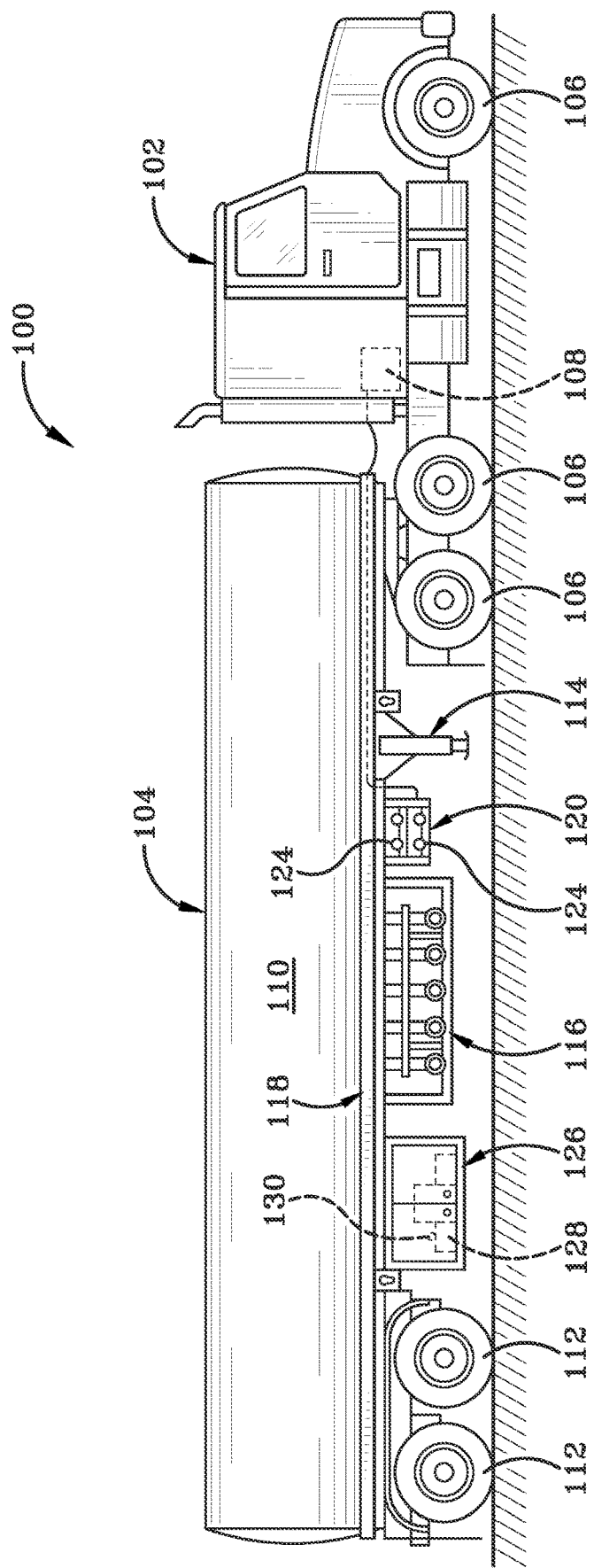
FIG. 1 is a side view of a vehicle with multiple safety arms in a stored position.

FIG. 1 depicts a vehicle 100. While the vehicle 100 is depicted as a truck, it is envisioned the vehicle 100 may be any vehicle. The vehicle 100 may include a tractor unit or a cab 102 and a trailer 104. The cab 102 may be connected to the trailer 104 to provide a pulling force for moving the vehicle 100.

The cab 102 includes one or more pairs of wheel assemblies 106 and a power source 108. The one or more wheel assemblies 106 may be adapted to support the cab 102 and the trailer 104. The power source 108 may be carried by the trailer 104.

Figure 2:
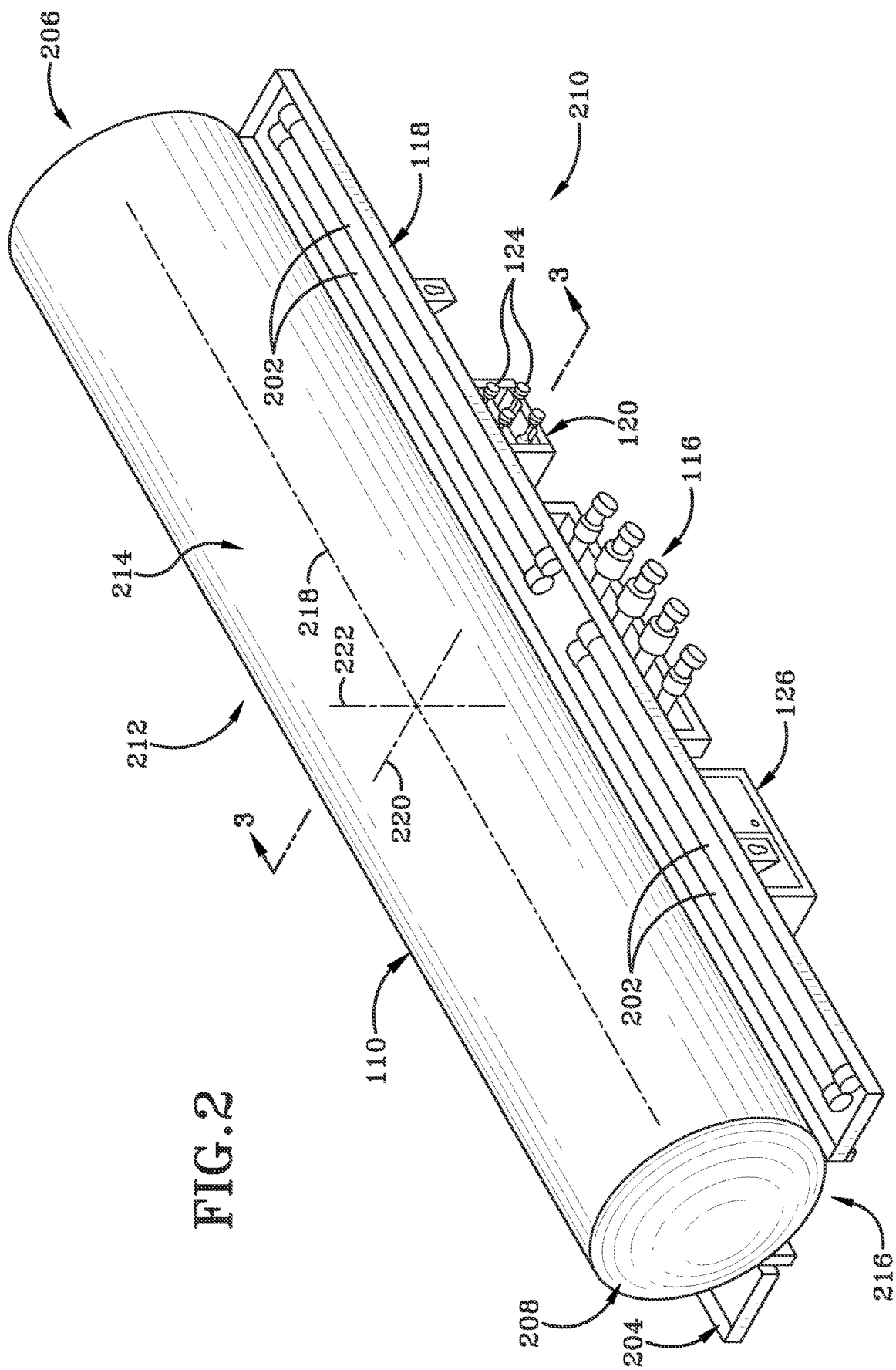
FIG. 2 is a side view of a trailer of the vehicle depicted in FIG. 1.

The trailer 104 includes a generally cylindrical tank 110, one or more pairs of wheel assemblies 112, a landing gear 114, and a nozzle assembly 116. The one or more wheel assemblies 112 may be adapted to support the tank 110. Furthermore, when the vehicle 100 is stationary, the landing gear 114 may be adapted to provide further support to the tank 110. The tank 110 includes a hollow interior for transporting material. The shape and size of the tank 110 will be dependent upon the material being transported. The nozzle assembly 116 may be on a side of the tank 110 and may be in open communication with the hollow interior of the tank 110. Hoses may be selectively engaged with the nozzle assembly 116 to transfer the material (i.e., fuel, liquid, grain, etc.) from the hollow interior of the tank 110 to a storage container. Although the trailer 104 is referred to herein as including a cylindrical tank 110, it is envisioned that the trailer 104 may include non-cylindrical trailers (i.e., rectangular cargo trailers). The trailer 104 further includes a first hose holder 118 connected to the tank 110. As shown in FIG. 2, the first hose holder 118 is adapted to hold one or more hoses 202. As further shown in FIG. 2, the trailer 104 includes a second hose holder 204 connected to the tank 110 and adapted to hold one or more hoses 202.

Returning to FIG. 1, the trailer 104 further includes and carries a safety arm holder 120 and one or more safety arm receivers. As will be discussed in further detail below, in one embodiment, the safety arm holder 120 is connected to the first hose holder 118 and the second hose holder 204. In another embodiment, the safety arm holder 120 may be mounted anywhere on any outer surface of the vehicle 100 (i.e., adjacent to the nozzle assembly 116). The safety arm holder 120 may be adapted to retain one or more safety arms 124 outside of the vehicle 100 while the vehicle 100 is stationary or moving. While the safety arm holder 120 is shown holding four safety arms 124, it is envisioned that the safety arm holder 120 may hold any number of safety arms 124 (i.e., 1, 3, 6, 9, 10, etc.). In one embodiment (FIG. 1), the safety arm holder 120 may be in electrical communication with the power source 108. Although the power source 108 is shown within cab 102, it is envisioned that the power source 108 may be located elsewhere on the vehicle 100. It is further envisioned that the power source 108 may be external from the vehicle 100.

As will be discussed in further detail below, the safety arm receivers are adapted to couple to a safety arm 124 such that, when coupled, a safety arm receiver provides vertical and horizontal support for a safety arm 124 so that a safety arm 124 may extend from the vehicle 100 without any support structure depending from the safety arm 124.

The trailer 104 further includes a bracket holder 126. Although the bracket holder 126 is shown connected to the first hose holder 118, it is envisioned that the bracket holder 126 may be connected to the second hose holder 204 or the tank 110. Furthermore, the bracket holder 126 may be adapted to contain a bracket 128 and a bracket support 130. As will be discussed in further detail below, the bracket 128 may be adapted to receive one or more safety arms 124 and the bracket support 130. The bracket support 130 may be adapted to support the bracket 128.

FIG. 2 depicts the tank 110. The tank 110 includes a first end 206, a second end 208, a first side 210, a second side 212, a top side 214, and a bottom side 216. The first end 206 faces the cab 102 and the second end 208 is opposite the first end 206. A central longitudinal axis 218 extends between and through the first end 206 and the second end 208 thereby defining a longitudinal direction between the first end 206 and the second end 208. The first side 210 is opposite the second side 212 and a central transverse axis 220 extends between and through the first side 210 and the second side 212 thereby defining a transverse direction between the first side 210 and the second side 212. The top side 214 is opposite the bottom side 216 and a central vertical axis 222 extends between and through the top side 214 and the bottom side 216 thereby defining a vertical direction between the top side 214 and the bottom side 216. The central longitudinal axis 218, the central transverse axis 220, and the central vertical axis 222 are oriented at right angles relative to one another.

Figure 3:
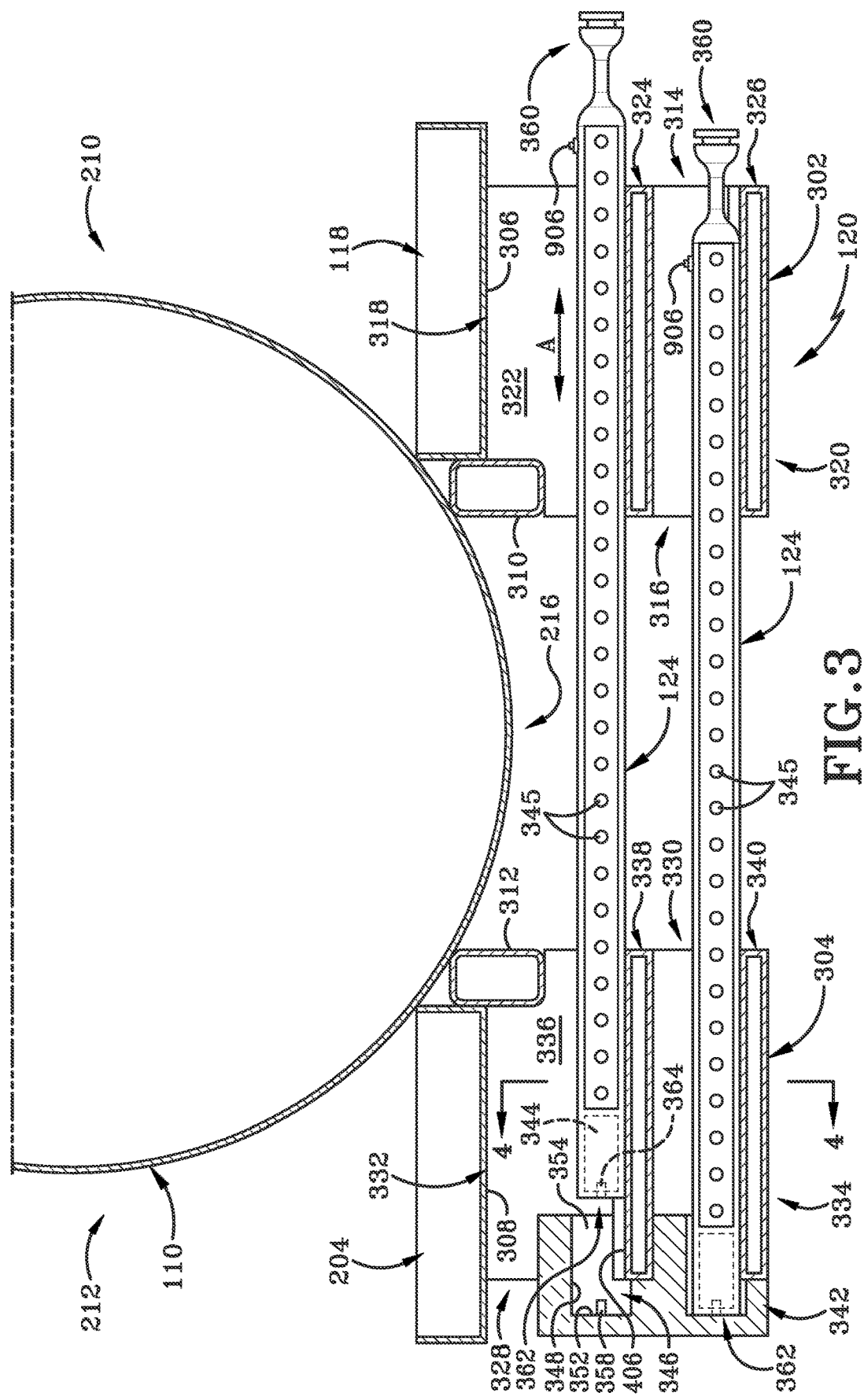
FIG. 3 is a cross sectional view of the trailer depicted in FIG. 2 along the line 3-3.

FIG. 3 depicts safety arms 124 in a stored position. The safety arm holder 120 slidably receives and supports the safety arms 124 and the safety arms 124 extend parallel to the central transverse axis 220 and perpendicular to the central longitudinal axis 218

The safety arm holder 120 includes a first holder 302 a distance away from a second holder 304. The distance between the first holder 302 and the second holder 304 is less than a length of a safety arm 124. As such, a safety arm 124 may be carried and retained by the first holder 302 and the second holder 304 when the vehicle 100 is stationary or moving.

In one embodiment, the first holder 302 may be connected to the first side 210 of the tank 110 and the second holder 304 may be connected to the second side 212 of the tank 110. In this embodiment, the first holder 302 may be connected to a bottom surface 306 of the first hose holder 118 and the second holder 304 may be connected to a bottom surface 308 of the second hose holder 204. The first holder 302 and the second holder 304 are further connected to a mounting member 310 and 312 respectively. The mounting members 310 and 312 are connected to the tank 110. In another embodiment, the first holder 302 and the second holder 304 may be anywhere on the vehicle 100 (i.e., on the first side 210 of the tank 110, on the second side 212 of the tank 110, etc.).

The first holder 302 includes a first end 314, a second end 316 opposite the first end 314, a top end 318, and a bottom end 320 opposite the top end 318. The first end 314 extends longitudinally relative to the central vertical axis 222 from the bottom surface 306 to the bottom end 320 and the second end 316 extends longitudinally relative to the central vertical axis 222 from the mounting member 310 to the bottom end 320. Opposing inner surfaces 322 extend longitudinally relative to the central vertical axis 222 from the top end 318 to the bottom end 320 and longitudinally relative to the central longitudinal axis 218 from the first end 314 to the second end 316. The first end 314 and the second end 316 are open ended such that when a safety arm 124 is moved in either direction of arrow A, a safety arm 124 may pass through the first holder 302.

The first holder 302 further includes a first rack 324 and a second rack 326. The first rack 324 is vertically above second rack 326. Stated another way, the second rack 326 is vertically below the first rack 324. The first rack 324 and the second rack 326 extend between the first end 314 and the second end 316 of the first holder 302. Furthermore, the first rack 324 and the second rack 326 are adapted to slidably receive and support one or more safety arms 124.

The second holder 304 includes a first end 328, a second end 330 opposite the first end 328, a top end 332, and a bottom end 334 opposite the top end 332. The first end 328 extends longitudinally relative to the central vertical axis 222 from the bottom surface 308 to the bottom end 334 and the second end 330 extends longitudinally relative to the central vertical axis 222 from the mounting member 312 to the bottom end 334. Opposing inner surfaces 336 extend longitudinally relative to the central vertical axis 222 from the top end 332 to the bottom end 334 and longitudinally relative to the central vertical axis 222 from the first end 328 to the second end 330.

The second holder 304 further includes a first rack 338 and a second rack 340. The first rack 338 is vertically above second rack 340. Stated another way, the second rack 340 is vertically below the first rack 338. The first rack 338 and the second rack 340 extend between the first end 328 and the second end 330 of the second holder 304. The first rack 338 and the second rack 340 are adapted to slidably receive and support one or more safety arms 124.

In one embodiment only the second end 330 of the second holder 304 is open ended. In this embodiment, when placing a safety arm 124 into the stored position, a safety arm 124 enters the safety arm holder 120 from the first side 210 of the tank 110, passes through the first end 314 of the first holder 302 and through the second end 330 of the second holder 304. Stated another way, a safety arm 124 first enters the first holder 302 then enters the second holder 304.

In another embodiment, the first end 328 and the second end 330 of the second holder 304 are open ended. In this embodiment, when placing a safety arm 124 in a stored position, a safety arm 124 may enter the safety arm holder 120 from the first side 210 or the second side 212 of the tank 110. Stated another way, a safety arm 124 may first pass through the first holder 302 and then into the second holder 304 or may first pass through the second holder 304 and then into the first holder 302.

In one embodiment (FIG. 3), the second holder 304 may be in electrical communication with the power source 108. In this embodiment, the second holder 304 includes a charging dock 342 and a safety arm 124 includes and carries a battery 344. The charging dock 342 is carried by the trailer 104 and is in electrical communication with the power source 108 and is adapted to charge the battery 344 of a safety arm 124 when a safety arm 124 is connected to the charging dock 342. In this embodiment, the battery 344 is in electrical communication and supplies power to a light source 345 of a safety arm 124.

The charging dock 342 includes a number of receptacles or channels 346. The number of channels 346 may depend upon the number of safety arms 124 that the safety arm holder 120 is adapted to retain. For example, in the embodiment shown in FIG. 2, the safety arm holder 120 is adapted to retain four safety arms 124. Hence, the charging dock 342 may contain four channels 346. It is envisioned that the charging dock 342 may contain any number of channels 346 (i.e., 1, 3, 6, 9, 10, etc.). The channels 346 are defined by a surface 348. The surface 348 extends from a side surface 352 to an opening 354. The surface 348 defines a shape of a channel 346. The shape of a channel 346 may correspond to a shape and a dimension of a safety arm 124. For example, in the embodiment shown in FIG. 4, a safety arm 124 has a circular shape. As such, a channel 346 may be circular with a diameter that corresponds to a diameter of a safety arm 124. Due to the corresponding shape and dimension, when a safety arm 124 is in the stored position, a portion of the safety arm 124 nests within the channel 346.

In the embodiment shown in FIG. 3, a channel 346 further includes a charging connector 358. The charging connector 358 is in electrical communication with the power source 108. Furthermore, a safety arm 124 includes a first end 360, a second end 362 opposite the first end 360 defining a longitudinal direction there between. In the embodiment shown in FIG. 3, a charging receptacle 364 extends inward from the second end 362 towards the first end 360 and is in electrical communication with the battery 344. The charging receptacle 364 has a complementary shape to the charging connector 358 and is adapted to slidably receive the charging connector 358 thereby connecting the charging connector 358 to the charging receptacle 364. When a safety arm 124 is in the stored position, the second end 362 of a safety arm 124 abuts the side surface 352 of the channel 346 and the charging receptacle 364 connects to the charging connector 358. The complementary shapes of the charging connector 358 and the charging receptacle 364 provides a frictional interference fit between the charging connector 358 and the charging receptacle 364. When the charging connector 358 is connected to the charging receptacle 364, the battery 344 is in electrical communication with the power source 108 which allows the power source 108 to charge the battery 344. The charging dock 342 may charge any number of safety arms 124 simultaneously.

As will be discussed in further detail below, a safety arm 124 further includes coupler that is adapted to attach or couple a safety arm 124 to the vehicle 100. A safety arm 124 is adapted to fall away from the vehicle 100 without damaging the vehicle 100 (i.e., the cab 102 or the trailer 104).

Figure 4:
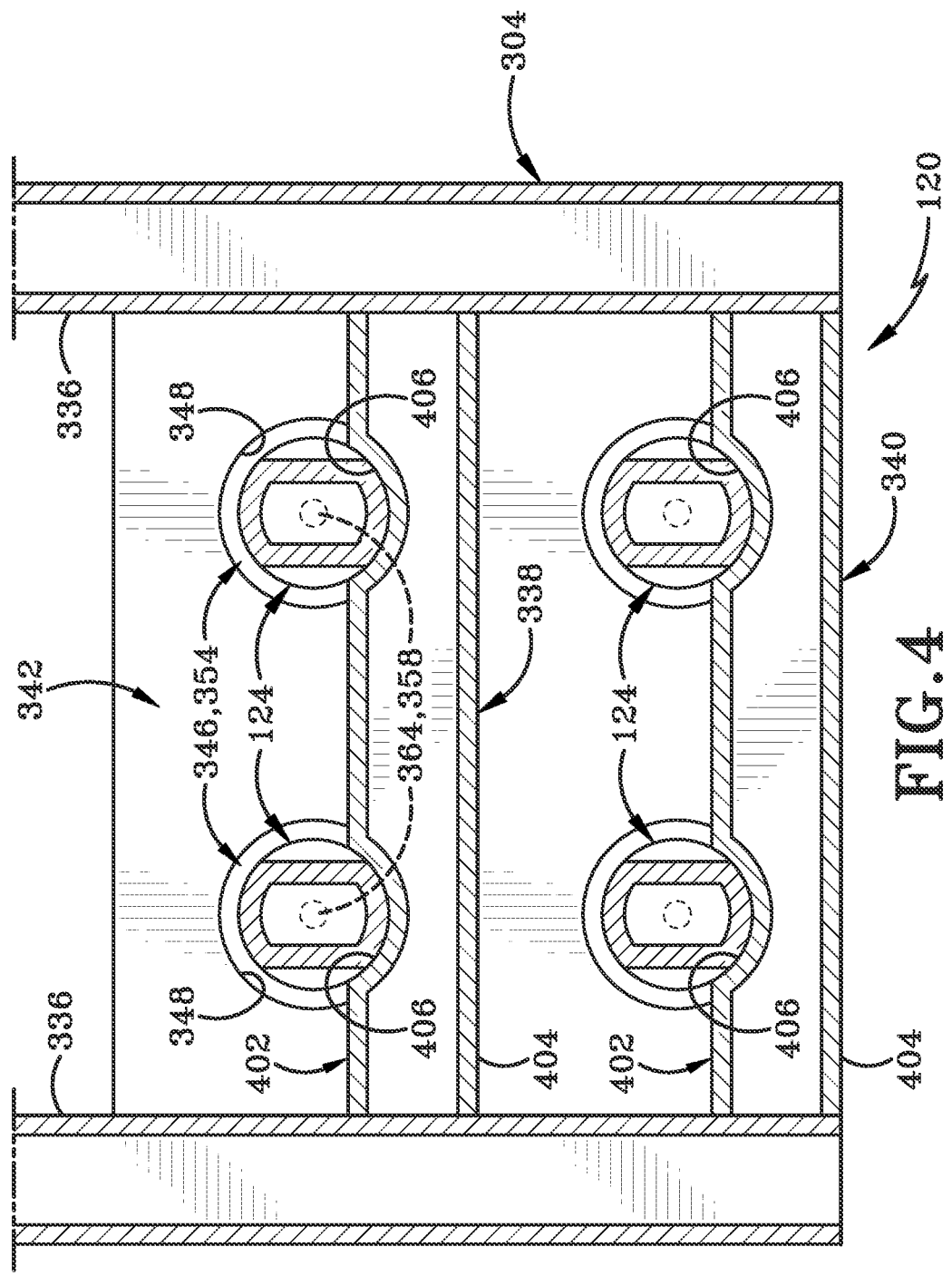
FIG. 4 is a cross sectional view of a safety arm holder depicted in FIG. 3 along the line 4-4.

FIG. 4 depicts the second holder 304. As shown in FIG. 4, the first rack 338 and the second rack 340 of the second holder 304 are structurally identical. For the sake of brevity, reference numerals on the first rack 338 correspond to identical elements on the second rack 340. Furthermore, it is understood that the first rack 338 and the second rack 340 are structurally identical to the first rack 324 and the second rack 326 of the first holder 302. The first rack 338 includes a first surface 402 and a second surface 404 opposite the first surface 402. The first surface 402 includes a number of grooves 406. The number of grooves 406 will be dependent upon a number of safety arms 124 that the safety arm holder 120 is adapted to retain. For example, in the embodiment shown in FIG. 2, the safety arm holder 120 is adapted to retain four safety arms 124. Hence, the first rack 338 contains two grooves 406 and the second rack 340 contains two grooves 406 for a total of four grooves 406. It is envisioned that either the first rack 338 or the second rack 340 may contain any number of grooves 406 (i.e., 1, 3, 6, 9, 10, etc.). It is further envisioned that the first holder 302 and the second holder 304 may contain any number of racks (1, 3, 6, 9, 10, etc.).

Furthermore, a shape and dimension of a groove 406 corresponds to a shape and dimension of a safety arm 124. For example, in the embodiment shown in FIG. 4, a groove 406 is semi-circular. The semi-circular shape corresponds to the circular shape and dimension of the safety arm 124. Due to the corresponding shape and dimension, when a safety arm 124 is in the stored position, the safety arm 124 nests within the groove 406. When the second holder 304 includes a charging dock 342, the surface 348 of a channel 346 is flush with groove 406 which allows a safety arm 124 to slide into the channel 346 from a first rack 338 or a second rack 340.

Figure 5:
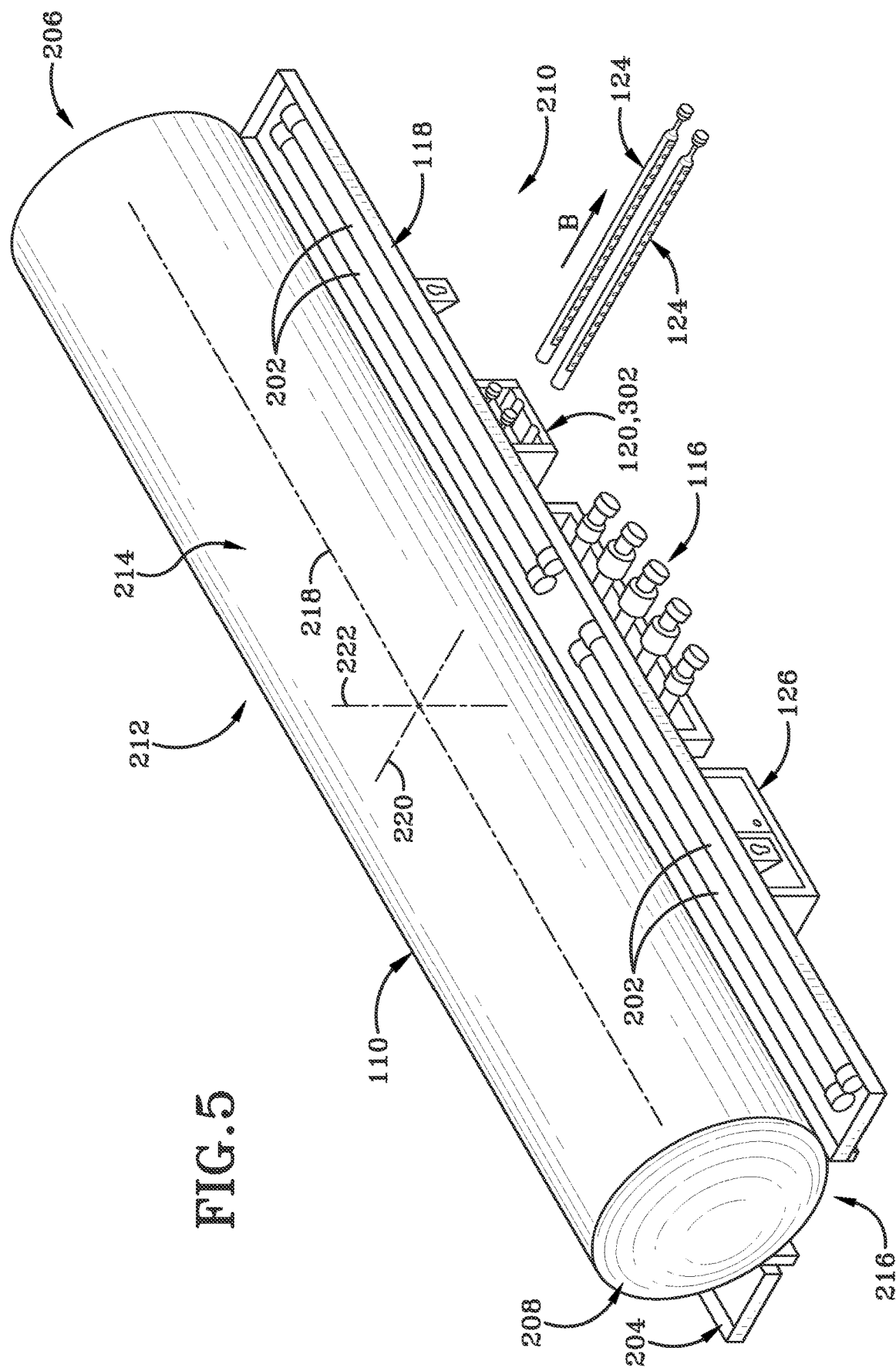
FIG. 5 is a side view of the trailer depicted in FIG. 2 with two safety arms removed from the trailer.

FIG. 5 depicts safety arms 124 removed from the trailer 104. In order to remove safety arms 124 from the trailer 104, safety arms 124 may be slidably moved in the direction of arrow B.

Figure 6:
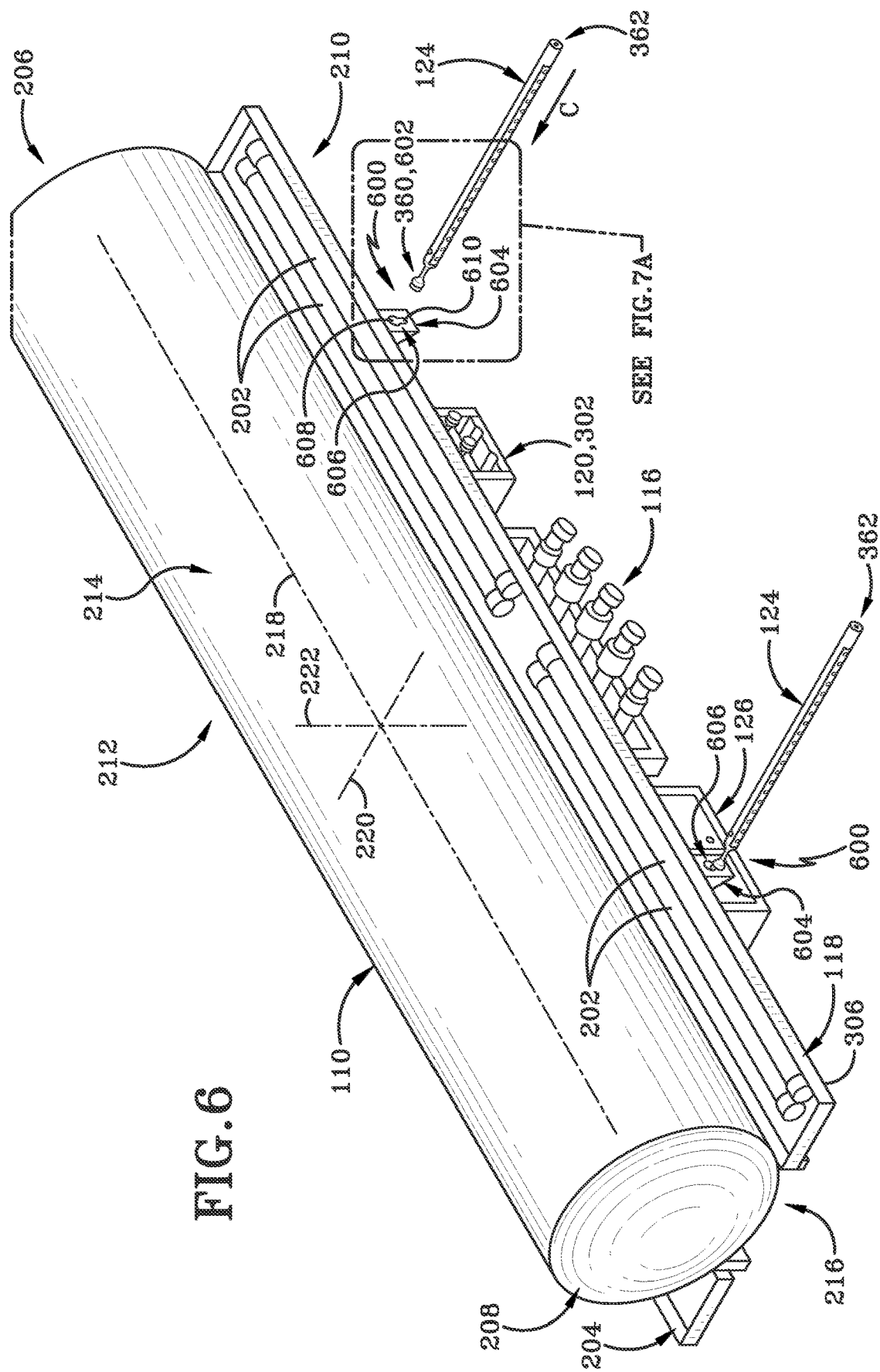
FIG. 6 is a side view of the trailer depicted in FIG. 2 with one safety arm coupled to a safety arm receiver.

FIG. 6 depicts a breakaway assembly 600. In this embodiment the breakaway assembly 600 includes a coupler 602 at the first end 360 of a safety arm 124 and a safety arm receiver 604 on the vehicle 100.

In this embodiment, the coupler 602 couples to safety arm receiver 604 by moving the safety arm 124 in the direction of arrow C. The safety arm receiver 604 includes a keyhole 606 with a first portion 608 and a second portion 610. The keyhole 606 receives the coupler 602 of a safety arm 124.

Figure 7A:
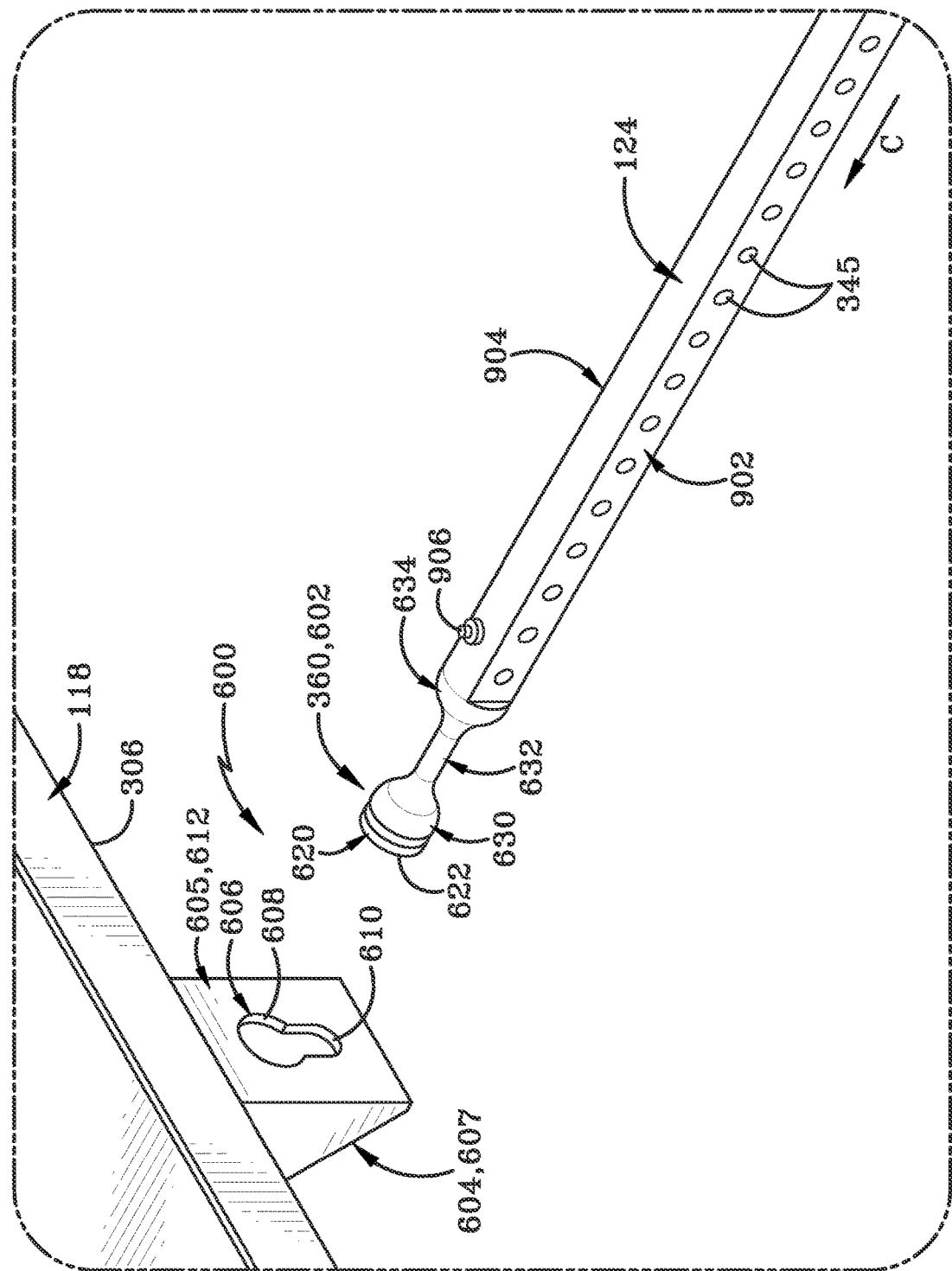
FIG. 7A is an enlarged view of a safety arm and a safety arm receiver depicted in FIG. 6.

FIGS. 7A-7C depict a safety arm 124 with coupler 602 and the safety arm receiver 604. The safety arm receiver 604 includes a first wall 605 and a second wall 607 that extend from the bottom surface 306 of the first hose holder 118. The second wall 607 includes an outer surface 612 and an inner surface 614. The keyhole 606 extends from the outer surface 612 to the inner surface 614. Although the safety arm receiver 604 is shown connected to the first hose holder 118, it is envisioned that the safety arm receiver 604, and other embodiments of arm receivers, may be connected to the second hose holder 204, the tank 110, or the cab 102.

The coupler 602 includes a first circular wall 620. The first circular wall 620 includes a first circular surface 622 and a second circular surface 624 opposite the first circular surface 622. The coupler 602 further includes a second circular wall 626 that extends from the second circular surface 624 to a circular surface 628 of a first tapered portion 630 of the coupler 602. The first circular wall 620 has a greater diameter than the second circular wall 626. The first tapered portion 630 extends from the circular surface 628 to a break portion 632 of the coupler 602. The break portion 632 extends from the first tapered portion 630 to a second tapered portion 634.

FIG. 7B depicts a safety arm 124 coupled to safety arm receiver 604. The keyhole 606 is dimensioned so that the first circular wall 620 may pass through the first portion 608 of the keyhole 606. The first circular wall 620 may pass through the first portion 608 by moving a safety arm 124 in the direction of arrow D. When the first circular wall 620 passes through the first portion 608 and the second circular wall 626 aligns with the second portion 610 of the keyhole 606, the safety arm 124 is then moved in the direction of arrow E thereby coupling the coupler 602 to the safety arm receiver 604.

FIG. 7C further depicts a safety arm 124 coupled to a safety arm receiver 604. The keyhole 606 extends from the outer surface 612 of the first wall 605 of the safety arm receiver 604 to the inner surface 614 of the first wall 605. When the coupler 602 is couple to the safety arm receiver 604, the second circular surface 624 abuts the inner surface 614 of the first wall 605, the circular surface 628 abuts the outer surface 612 of the first wall 605 and the second circular wall 626 nests within the second portion 610 of the keyhole 606.

Figure 8:
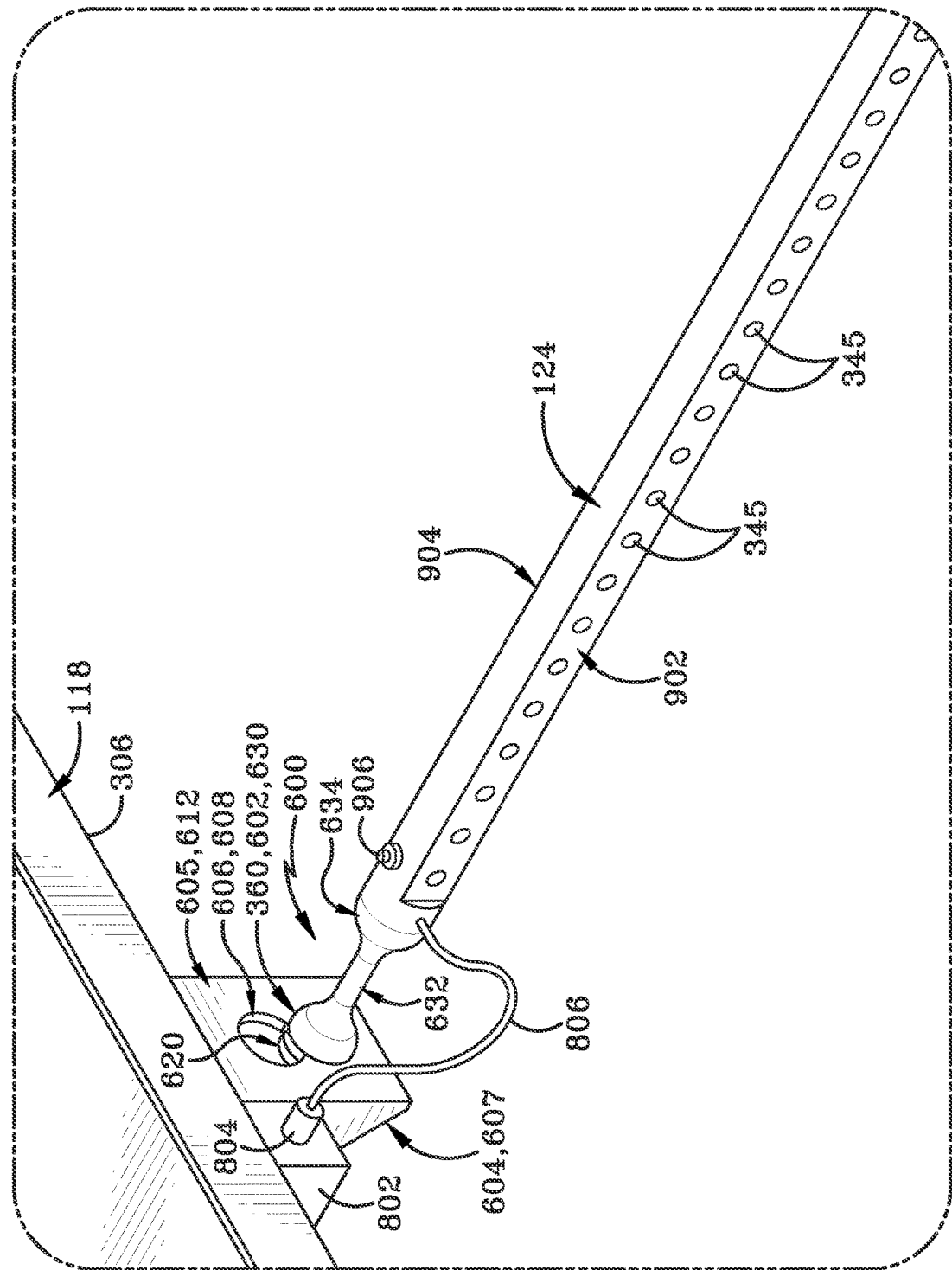
FIG. 8 is an enlarged view of an embodiment of safety arm with a power plug coupled to a power outlet.

FIG. 8 depicts an embodiment wherein a power outlet 802 is connected to the first hose holder 118 and adjacent to the safety arm receiver 604. In another embodiment, the power outlet 802 may be connected to the second hose holder 204 or anywhere else on the vehicle 100. The power outlet 802 is in electrical communication with the power source 108. In this embodiment, the power outlet 802 is adapted to receive a plug 804 of a safety arm 124. The plug 804 is connected to a wire 806 that places the plug 804 in electrical communication with the light source 345. As such, when the power outlet 802 receives the plug 804, the power source 108 supplies power to the light source 345 of the safety arm 124.

Figure 9:
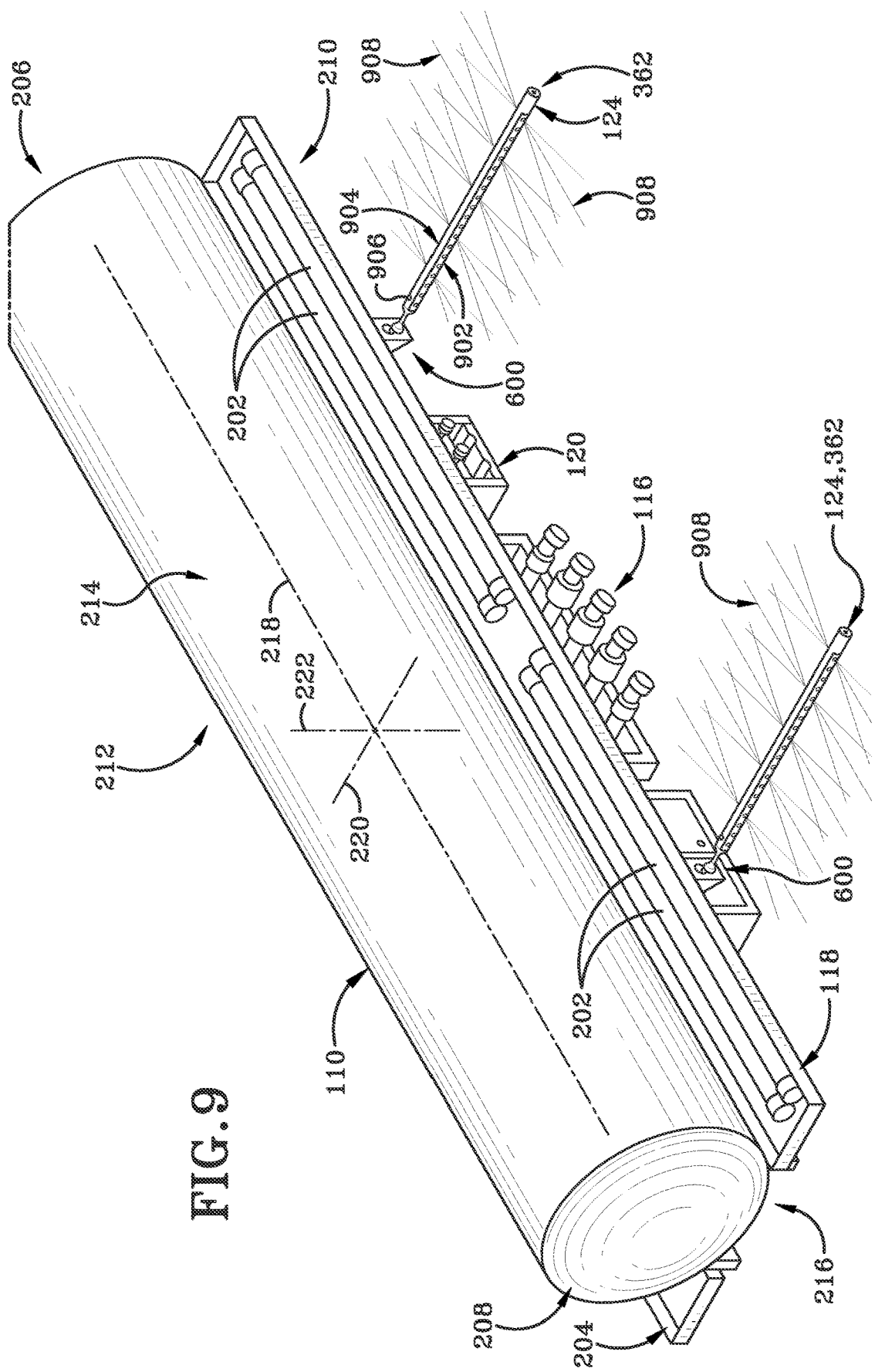
FIG. 9 is a side view of the trailer depicted in FIG. 2 with two safety arms coupled to two safety arm receivers.

FIG. 9 depicts two safety arms 124 in an operational position. When in the operational position, one safety arm 124 or two safety arms 124, as depicted in FIG. 9, extend outwardly from the vehicle 100 thereby creating a safety zone. While FIG. 9 depicts two safety arms 124 coupled to the trailer 104, it is understood that any number of safety arms 124 may be coupled to the vehicle 100 (i.e., the trailer 104 or the cab 102). The safety arms 124 include a first side 902, a second side 904 opposite the first side 902, and power switch 906. While FIG. 9 depicts the light source 345 on the first side 902 and the second side 904 of the safety arm 124, it is envisioned that the safety arm 124 may include the light source 345 on only the first side 902 or only the second side 904. In this embodiment, the two safety arms 124 are coupled to the first side 210 and adjacent to the nozzle assembly 116.

The power switch 906 controls the flow of electricity from a battery 344 or the power source 108 to the light source 345. A user may engage the power switch 906 a number of times to power a light source 345. For example, when a safety arm 124 includes the light source 345 on the first side 902 and the second side 904 and is off (i.e., no light is being emitted from the light source 345 on either the first side 902 or the second side 904), a user may engage the power switch 906 a first time to cause a light source 345 to emit light from the first side 902 and the second side 904. After engaging the power switch 906 a first time to emit light from both the first side 902 and the second side 904, the user may engage the power switch 906 a second time to emit light from only one side (i.e., the first side 902 or the second side 904) of the safety arm 124. The user may then engage the power switch 906 a third time to power off the safety arm 124 (i.e., no light is being emitted from the light source 345 on either the first side 902 or the second side 904). When on, the light source 345 emits light 908 that illuminates an area adjacent to the vehicle 100. The light source 345 may be any suitable source of illumination including, but not limited to, at least one strip of light emitting diodes.

Figure 10:
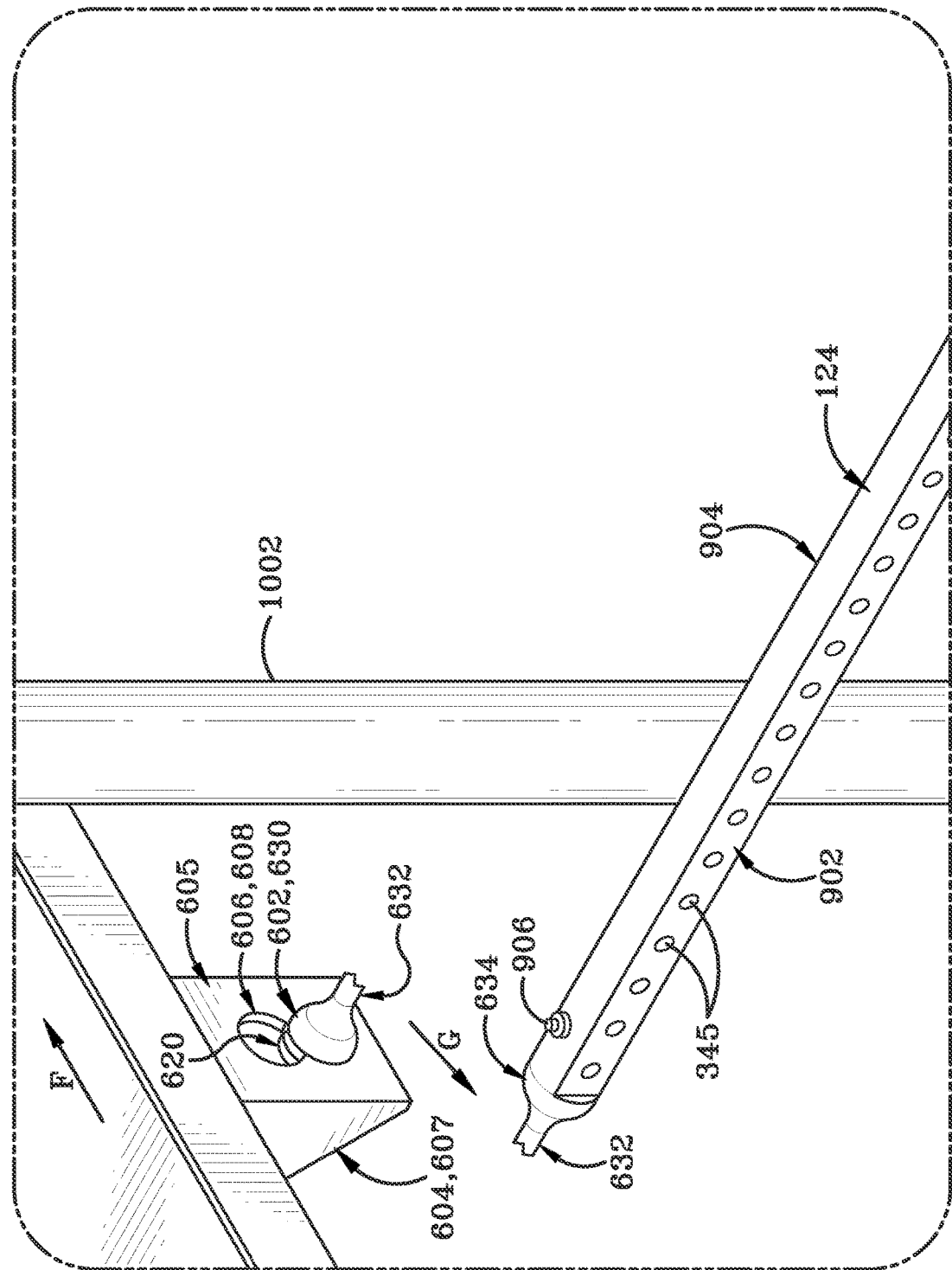
FIG. 10 is an enlarged view of a safety arm depicted in FIG. 9 contacting an object and breaking away from a safety arm receiver.

FIG. 10 depicts a safety arm 124 contacting an object 1002 (i.e., a stationary pole). In one embodiment, the coupler 602 may be formed from a suitably rigid material so as to support the safety arm 124 when the safety arm 124 is coupled to the safety arm receiver 604 without any support structure depending from the safety arm 124. Furthermore, the integral structure of the coupler 602 may be formed from multiple elements having similar configurations as one having ordinary skill in the art would understand.

In one embodiment, the first tapered portion 630, the break portion 632, and the second tapered portion 634 are formed of the same material. In another embodiment, the first tapered portion 630, the break portion 632, and the second tapered portion 634 are formed of different materials. In this embodiment, the break portion 632 is formed of a material that is less rigid, and therefore more susceptible to breaking, than a material that forms a remainder of the coupler 602 including the first tapered portion 630 and the second tapered portion 634. Furthermore, the break portion 632 has a smaller diameter than the first tapered portion 630 and the second tapered portion 634. As such, the break portion 632 is less rigid and more susceptible to breaking than the remainder of the coupler 602 including first tapered portion 630 or the second tapered portion 634.

In one example, when the vehicle 100 moves in the direction of arrow F and the object 1002 contacts the safety arm 124, a force is applied to the safety arm 124 causing the safety arm 124 to move in the direction of arrow G. This force may cause the coupler 602 to break within the break portion 632. Due to the location of the break portion 632, when the break portion 632 breaks, the vehicle 100 is undamaged. When the break portion 632 breaks, the safety arm 124 falls away from the vehicle 100.

Figure 11:
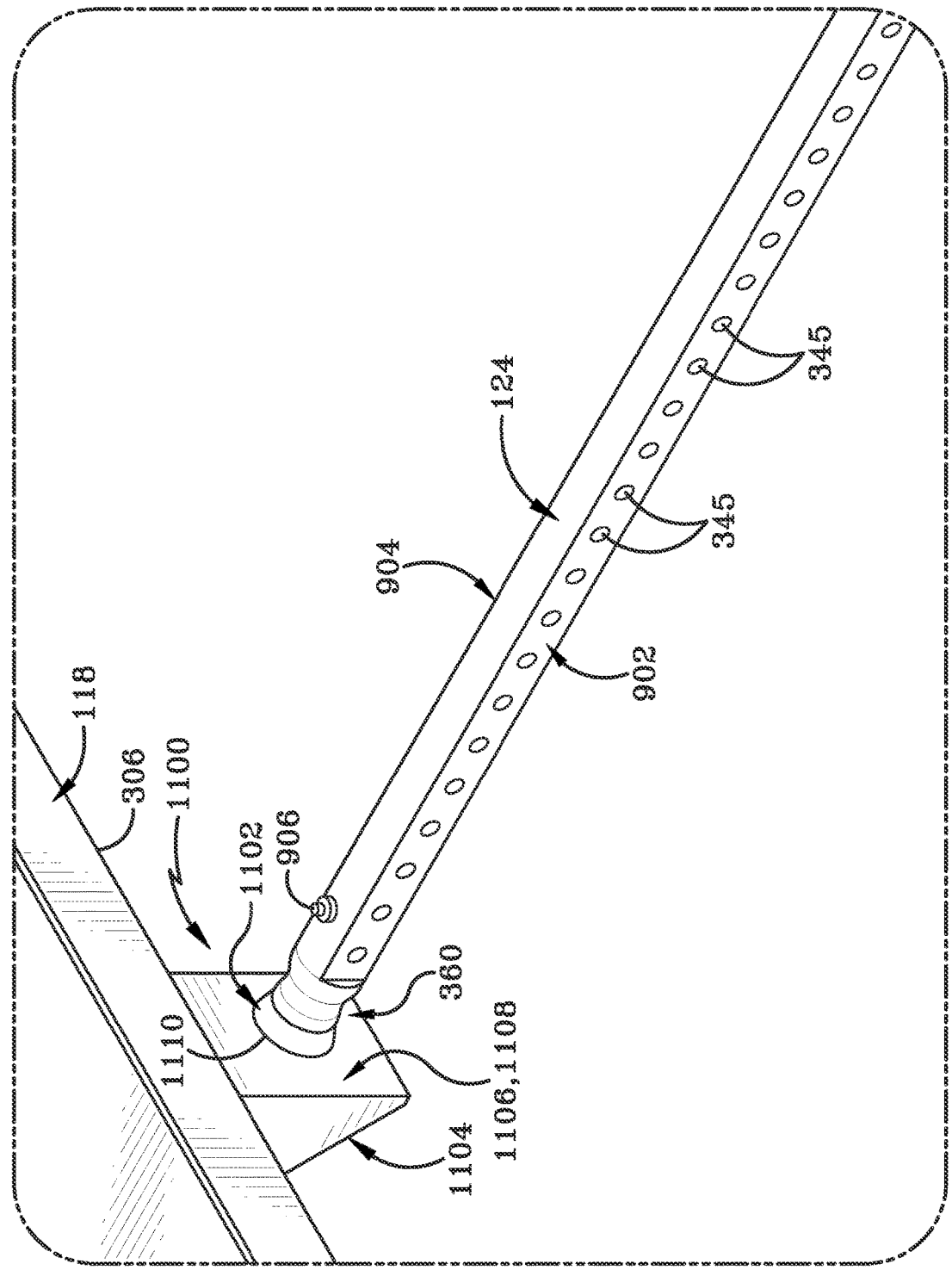
FIG. 11 is an enlarged view of a safety arm that is magnetized to a safety arm receiver.

FIG. 11 depicts a breakaway assembly 1100. In this embodiment, the breakaway assembly 1100 includes a coupler 1102 at the first end 360 of a safety arm 124 and a safety arm receiver 1104 on the vehicle 100.

In this embodiment, the coupler 1102 includes a magnet that couples to a safety arm receiver 1104 that is formed from a suitable ferromagnetic material. The safety arm receiver 1104 includes a first wall 1106 that includes a surface 1108. The coupler 1102 includes a surface 1110 that defines the first end 360 of a safety arm 124 and magnetizes the coupler 1102 to the surface 1108 of the safety arm receiver 1104. In this embodiment, the coupler 1102 may be suitably strong to support the safety arm 124 when the safety arm 124 is coupled to the safety arm receiver 1104 without any support structure depending from the safety arm 124.

Figure 12:
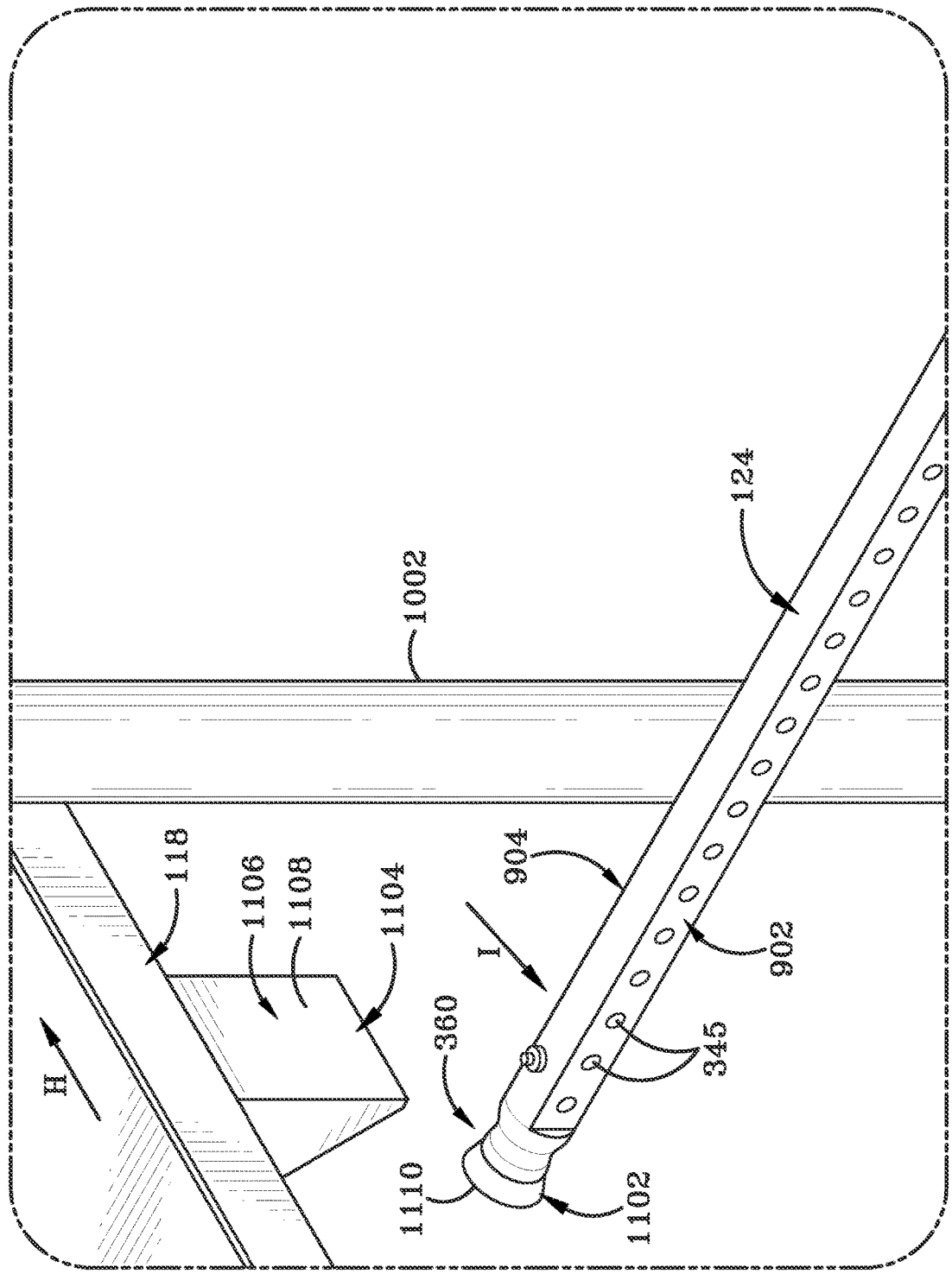
FIG. 12 depicts the safety arm depicted in FIG. 11 contacting an object and falling away from the safety arm receiver.

FIG. 12 depicts a safety arm 124 contacting the object 1002. In this embodiment, the coupler 1102 may not be strong enough to support the safety arm 124 when the safety arm 124 contacts the object 1002. For example, when the vehicle 100 moves in the direction of arrow H and the object 1002 contacts the safety arm 124, a force is applied to the safety arm 124 causing the safety arm 124 to move in the direction of arrow I. This force causes the coupler 1102 to demagnetize from the safety arm receiver 1104. When the coupler 1102 demagnetizes from the safety arm receiver 1104 due to a force applied to the safety arm 124, the safety arm 124 falls away from the vehicle 100 with the coupler 1102 and without damaging the vehicle 100. In this embodiment, the safety arm 124 may be undamaged and the safety arm 124 may be recoupled to the safety arm receiver 1104.

Figure 13:
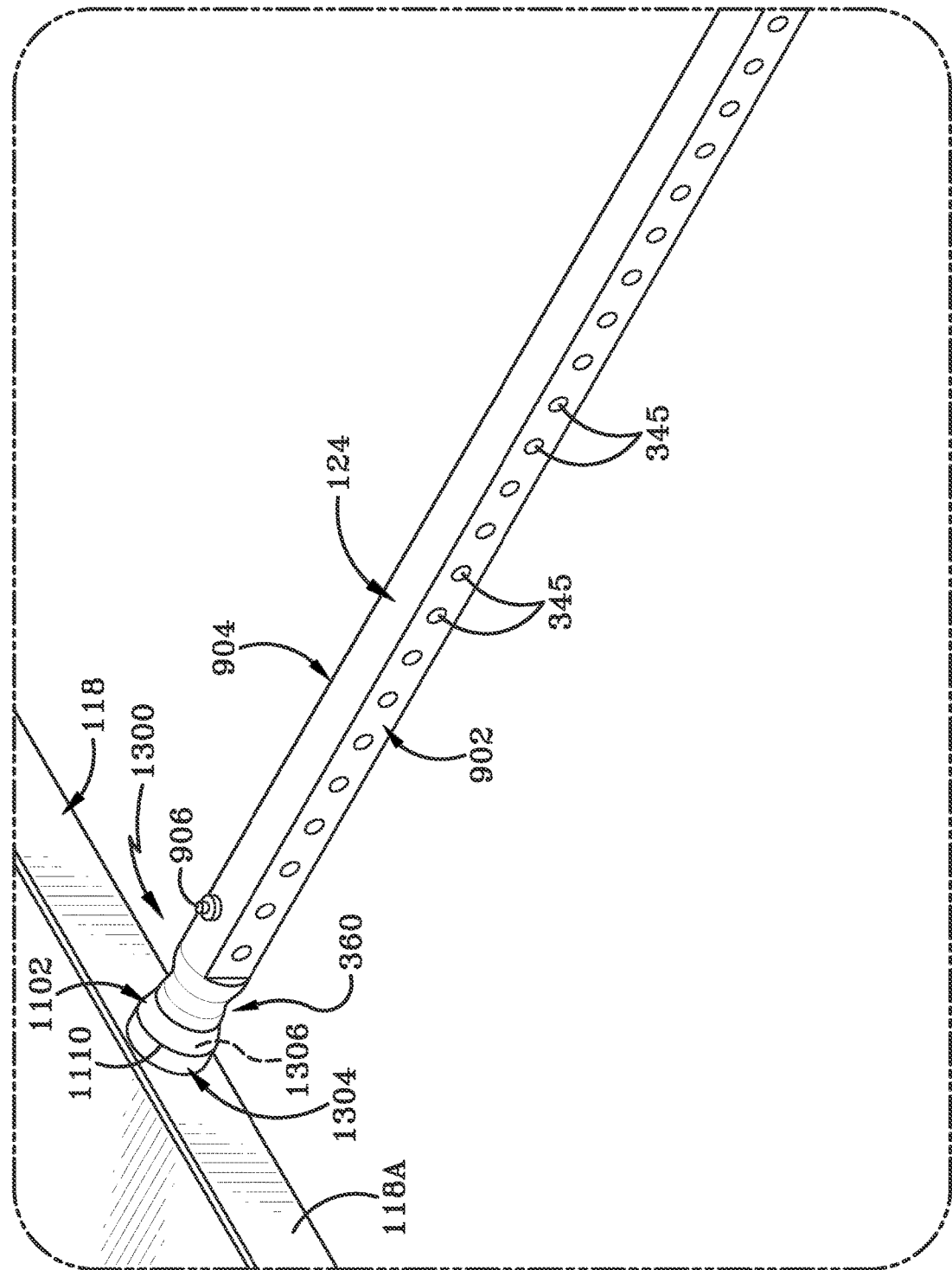
FIG. 13 is an enlarged view of a safety arm in the operational position that is magnetized to the vehicle.

Although FIGS. 11 and 12 depict the coupler 1102 coupled to a safety arm receiver 1104, it is envisioned that the coupler 1102 may couple a safety arm 124 to any ferromagnetic surface of the vehicle 100. For example, FIG. 13 depicts a breakaway assembly 1300. In this embodiment, the breakaway assembly 1300 includes the coupler 1102 and a safety arm receiver 1304. In this embodiment, the safety arm receiver 1304 may be a disk extending from a surface 118A of the first hose holder 118. While the safety arm receiver 1304 is depicted as extending from the first hose holder 118, it is envisioned that the safety arm receiver 1304 may extend any surface of the vehicle 100. The safety arm receiver 1304 may be made formed of a ferromagnetic material or a magnet that attracts the coupler 1102.

Figure 14:
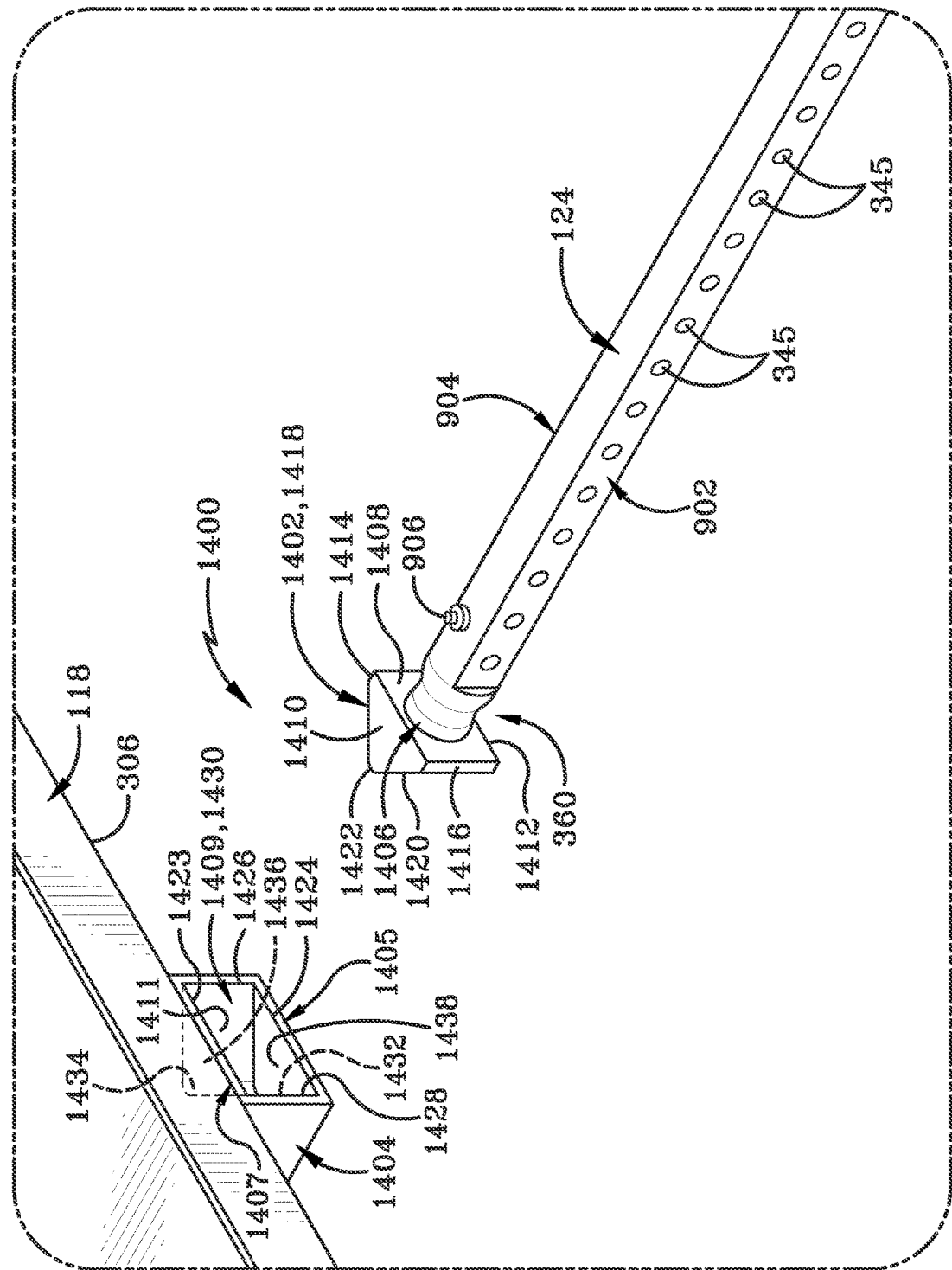
FIG. 14 is an enlarged view of an embodiment of a safety arm a triangularly shaped coupler and a safety arm receiver.

FIG. 14 depicts a breakaway assembly 1400. In this embodiment, the breakaway assembly 1400 includes a coupler 1402 and a safety arm receiver 1404. The coupler 1402 is generally triangular in shape and the safety arm receiver 1404 has a complimentary triangular shape.

In this embodiment, the coupler 1402 defines the first end 360 of a safety arm 124. A neck 1406 extends from the safety arm 124 to a first surface 1408 of the coupler 1402. The first surface 1408 extends between a second surface 1410 and a third surface 1412. A fourth surface 1414 and a fifth surface 1416 opposite the fourth surface 1414 extend from and generally perpendicular to the first surface 1408 to a first angled surface 1418 and a second angled surface 1420. The fourth surface 1414 and the fifth surface 1416 extend between the second surface 1410 and the third surface 1412. The first angled surface 1418 is opposite the second angled surface 1420. The first angled surface 1418 and the second angled surface 1420 extend from the fourth surface 1414 and the fifth surface 1416 respectively to a rounded corner 1422. Furthermore, the first angled surface 1418, the second angled surface 1420, and the rounded corner 1422 extend between the second surface 1410 the third surface 1412.

The safety arm receiver 1404 is adapted to receive the coupler 1402 and includes a bottom wall 1405 and a top wall 1407. The safety arm receiver 1404 further includes a first outer edge 1423, a second outer edge 1424 opposite the first outer edge 1423, a third outer edge 1426, and a fourth outer edge 1428 opposite the third outer edge 1426. The third outer edge 1426 and the fourth outer edge 1428 extend between the bottom wall 1405 and the top wall 1407. The first outer edge 1423 and the second outer edge 1424 extend between and generally perpendicular to the third outer edge 1426 and the fourth outer edge 1428. The third outer edge 1426 and the fourth outer edge 1428 extend between and generally perpendicular to the first outer edge 1423 and the second outer edge 1424. The first outer edge 1423, the second outer edge 1424, the third outer edge 1426, and the fourth outer edge 1428 define an aperture 1411 that receives the coupler 1402.

The safety arm receiver 1404 further includes an angled wall 1409. The angled wall 1409 includes a first angled surface 1430, a second angled surface 1432 opposite the first angled surface 1430, a rounded corner 1434. The safety arm receiver 1404 further includes a first surface 1436, and a second surface 1438. The first angled surface 1430 and the second angled surface 1432 extend from the third outer edge 1426 and the fourth outer edge 1428 respectively to the rounded corner 1434. The first angled surface 1430, the second angled surface 1432, and the rounded corner 1434 extend between the first surface 1436 and the second surface 1438. The first surface 1436 and the second surface 1438 extend between the first angled surface 1430 and the second angled surface 1432. Furthermore, the first surface 1436 extends between the first outer edge 1423 and the rounded corner 1434 and the second surface 1438 extends between the second outer edge 1424 and the rounded corner 1434.

Figure 15:
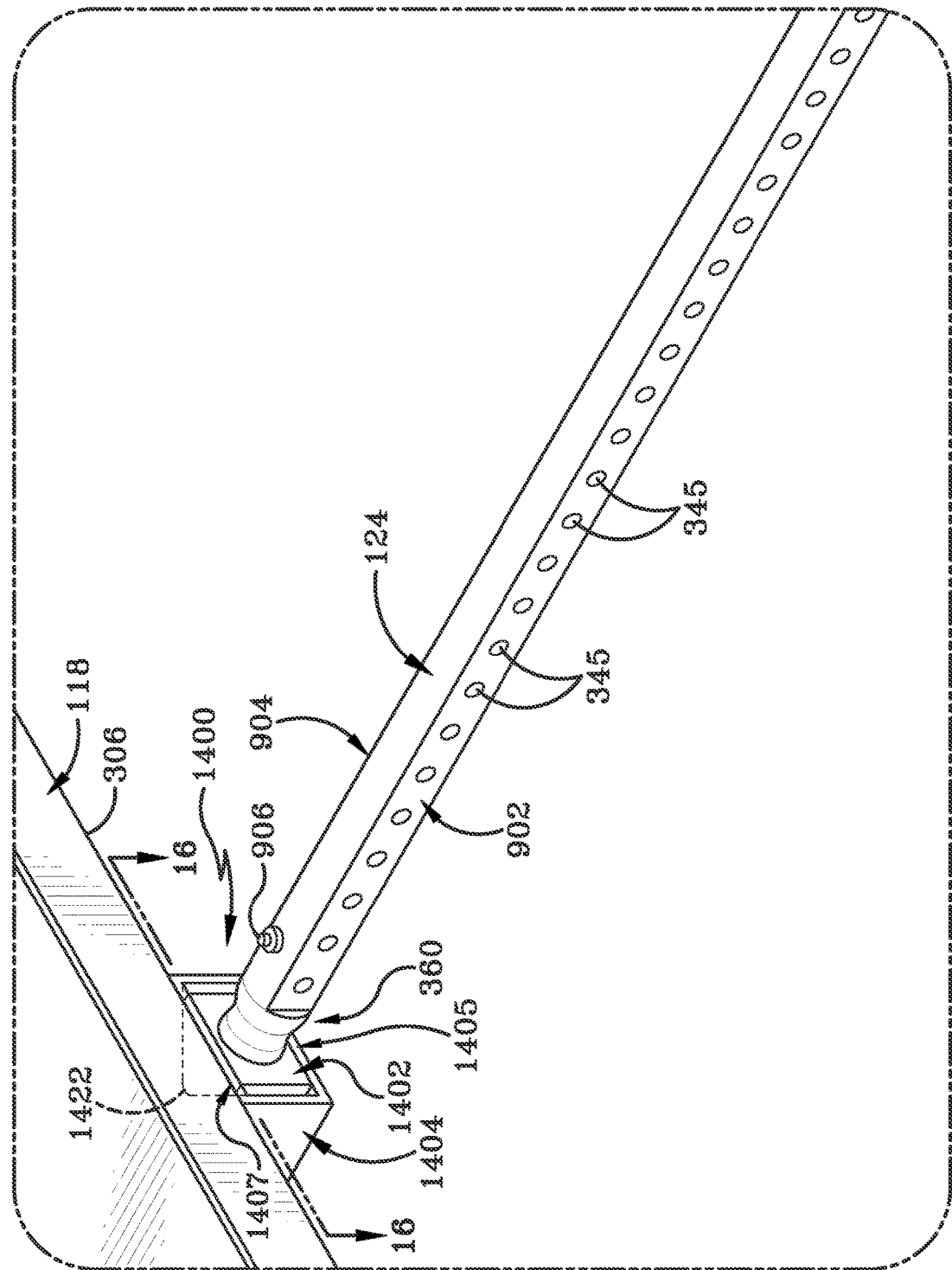
FIG. 15 is an enlarged view of the safety arm depicted in FIG. 14 in coupled to a safety arm receiver.
Figure 16:
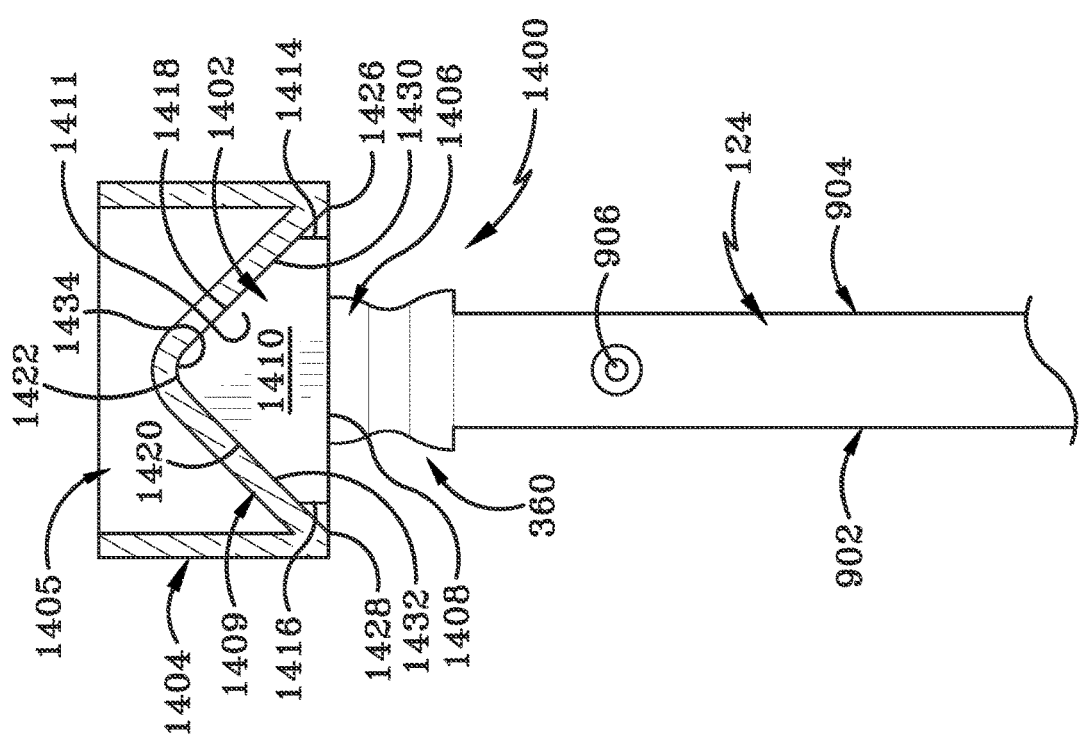
FIG. 16 is a top view of the safety arm depicted in FIG. 15 along the line 16-16 coupled to a safety arm receiver.

As depicted in FIGS. 15 and 16, when the coupler 1402 is coupled to the safety arm receiver 1404, the coupler 1402 nests within the safety arm receiver 1404. When the coupler 1402 nests within the safety arm receiver 1404, the second surface 1410 of the coupler 1402 abuts the first surface 1436 of the safety arm receiver 1404, the third surface 1412 of the of coupler 1402 abuts the second surface 1438 of the safety arm receiver 1404, the rounded corner 1422 of the coupler 1402 abuts the rounded corner 1434 of the safety arm receiver 1404, the first angled surface 1418 of coupler 1402 abuts the first angled surface 1430 of the safety arm receiver 1404, and the second angled surface 1420 of coupler 1402 abuts the second angled surface 1432 of the safety arm receiver 1404.

As depicted in FIG. 16, the first angled surface 1418 is not as long as the first angled surface 1430 and the second angled surface 1420 is not as long as the second angled surface 1432. As a result, the fourth surface 1414 and the fifth surface 1416 of coupler 1402 do not abut a surface of the safety arm receiver 1404.

Figure 17:
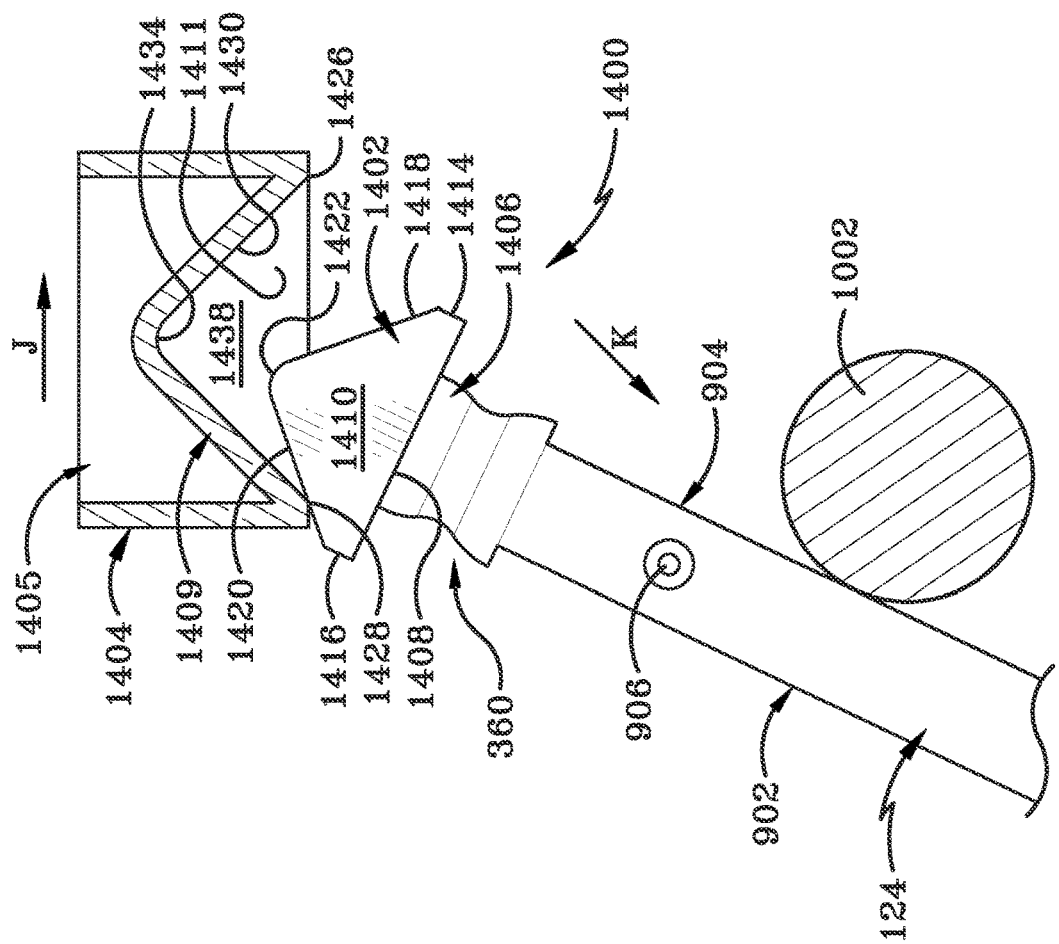
FIG. 17 is a top view of the safety arm depicted in FIG. 15 along the line 16-16 contacting an object.

FIG. 17 depicts a safety arm 124 contacting the object 1002. In this embodiment, when the safety arm 124 contacts the object 1002 the safety arm 124 falls away from the vehicle 100 with coupler 1402. For example, when the vehicle 100 moves in the direction of arrow J and the object 1002 contacts the safety arm 124, a force is applied to the safety arm 124 causing the safety arm 124 to move in the direction of arrow K. This force causes coupler 1402 to detach or decouple from the safety arm receiver 1404. When coupler 1402 decouples from the safety arm receiver 1404 due to a force applied to the safety arm 124, the safety arm 124 falls away from the vehicle 100 without damaging the vehicle 100. In this embodiment, the safety arm 124 may be undamaged and the coupler 1402 may be recoupled to the safety arm receiver 1404.

Figure 18:
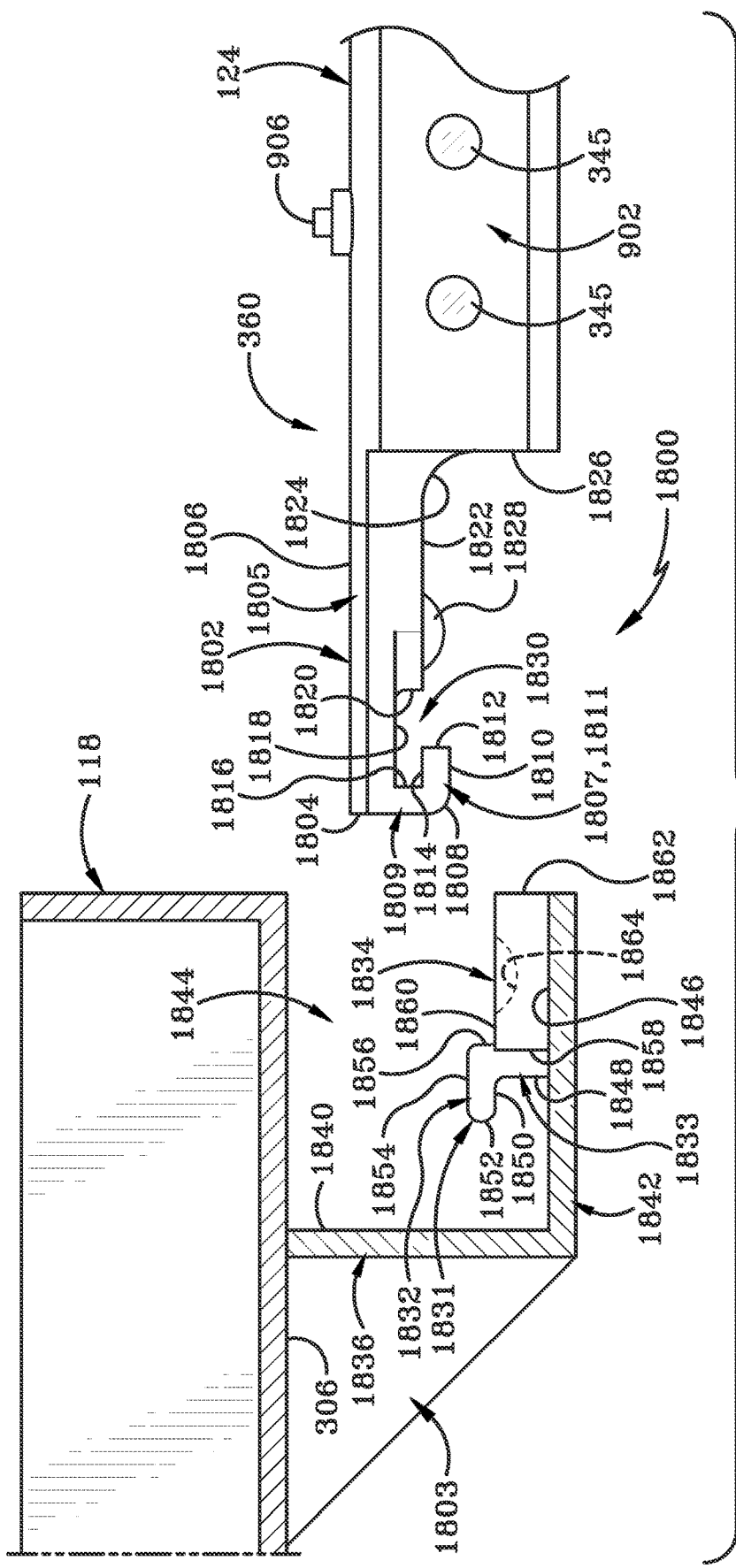
FIG. 18 is a side view of an embodiment of a safety arm with a ball lock and a safety arm receiver.

FIG. 18 depicts a breakaway assembly 1800. In this embodiment, the breakaway assembly 1800 includes a coupler 1802 at the first end 360 of a safety arm 124 and a safety arm receiver 1803 on the vehicle 100. While FIG. 18 depicts the safety arm receiver 1803 on the first hose holder 118, it is envisioned that the safety arm receiver 1803 may be coupled to the second hose holder 204.

The coupler 1802 includes an extension 1805 that extends from the safety arm 124. The coupler 1802 further includes a hook 1807 that extends from the extension 1805. The hook 1807 includes a first leg 1809 and a second leg 1811 that is perpendicular to the first leg 1809. The coupler 1802 further includes a first surface 1804 of the coupler 1802 extends longitudinally relative to the central vertical axis 222 from a first surface 1806 of the extension 1805 to a first rounded corner 1808.

The first rounded corner 1808 convexly curves downward relative to the central vertical axis 222 approximately 90° from the first surface 1804 to a second surface 1810 of the coupler 1802. The second surface 1810 extends longitudinally relative to the central transverse axis 220 from the first rounded corner 1808 to a third surface 1812 of the coupler 1802. The third surface 1812 extends longitudinally relative to the central vertical axis 222 from the second surface 1810 to a fourth surface 1814. The fourth surface 1814 extends longitudinally relative to the central transverse axis 220 from the third surface 1812 to a fifth surface 1816 of the coupler 1802. The fifth surface 1816 extends longitudinally relative to the central vertical axis 222 from the fourth surface 1814 to a sixth surface 1818. The sixth surface 1818 extends longitudinally relative to the central transverse axis 220 from the fifth surface 1816 to a seventh surface 1820. The seventh surface 1820 extends longitudinally relative to the central vertical axis 222 from the sixth surface 1818 to an eighth surface 1822. The eighth surface 1822 extends longitudinally relative to the central transverse axis 220 from the seventh surface 1820 to a second rounded corner 1824. The second rounded corner 1824 concavely curves downward relative to the central vertical axis 222 from the eighth surface 1822 to a terminal surface 1826 of the safety arm 124.

The first surface 1804, the third surface 1812, the fifth surface 1816, the seventh surface 1820, and the terminal surface 1826 extend generally parallel relative to the central vertical axis 222. The second surface 1810, the fourth surface 1814, the sixth surface 1818, and the eighth surface 1822 extend generally perpendicular relative to the central vertical axis 222.

A hemispherical member 1828 extends longitudinally relative to the central vertical axis from the eighth surface 1822. As will be discussed in further detail below, the hemispherical member 1828 is adapted to nest within the safety arm receiver 1803. The third surface 1812, the fourth surface 1814, the fifth surface 1816, the sixth surface 1818, and the seventh surface 1820 define an opening 1830. As will be discussed in further detail below, when the coupler 1802 is coupled to the safety arm receiver 1803, a portion of the safety arm receiver 1803 nests within the opening 1830.

The safety arm receiver 1803 includes a post member 1832 and a hemispherical receptacle 1834. The post member 1832 includes a first leg 1831 and a second leg 1833 that is perpendicular to the first leg 1831. The safety arm receiver 1803 further includes a first wall 1836. The first wall 1836 extends longitudinally relative to the central vertical axis 222 from the bottom surface 306 of the first hose holder 118. The first wall 1836 includes a surface 1840 that extends longitudinally relative to the central vertical axis 222 from the bottom surface 306 to a second wall 1842. The first wall 1836 extends generally parallel to the central vertical axis 222 and the second wall 1842 extends generally perpendicular to the central vertical axis 222. The first wall 1836, the second wall 1842, and the bottom surface 306 define an inlet 1844. As will be discussed in further detail below, in order to couple the coupler 1802 to the safety arm receiver 1803, the coupler 1802 passes through the inlet 1844.

The post member 1832 extends longitudinally relative to the central vertical axis 222 from a surface 1846 of the second wall 1842. The post member 1832 includes a first surface 1848. The first surface 1848 extends longitudinally relative to the central vertical axis 222 to a second surface 1850. The second surface 1850 extends longitudinally relative to the central transverse axis 220 to a rounded surface 1852. The rounded surface 1852 concavely curves upward relative to the central vertical axis 222 approximately 180° from the second surface 1850 to a third surface 1854. The third surface 1854 extends longitudinally relative to the central transverse axis 220 to a fourth surface 1856. The fourth surface 1856 extends longitudinally relative to the central vertical axis 222 to the surface 1846 of the second wall 1842. The first surface 1848 and the third surface 1854 extend generally parallel to the central vertical axis 222 while the second surface 1850 and the fourth surface 1856 extend generally perpendicular to the central vertical axis 222.

The hemispherical receptacle 1834 includes a first surface 1858 that extends longitudinally relative to the central vertical axis 222 from the surface 1846 of the second wall 1842 to a second surface 1860. The second surface 1860 extends longitudinally relative to the central transverse axis 220 from the first surface 1858 to a third surface 1862. Furthermore, the second surface 1860 includes a hemispherical surface 1864. As will be discussed in further detail below, the hemispherical surface 1864 is adapted to receive the hemispherical member 1828 of the coupler 1802. The third surface 1862 extends longitudinally relative to the central vertical axis from the second surface 1860 to the surface 1846 of the second wall 1842. Furthermore, the first surface 1858 of the hemispherical receptacle 1834 abuts the fourth surface 1856 of the post member 1832.

Figure 19:
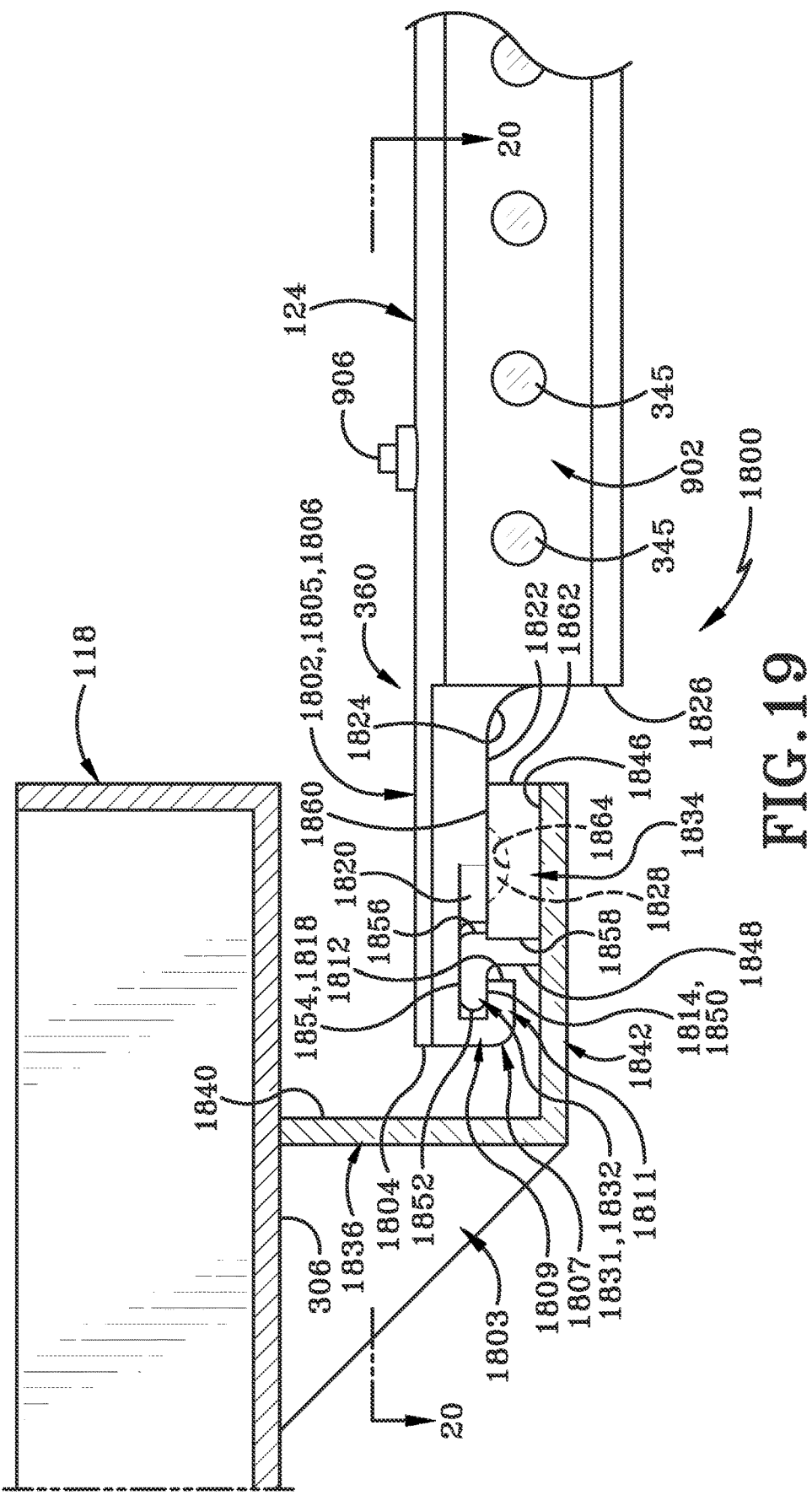
FIG. 19 is a side view of the safety arm depicted in FIG. 18 in the coupled to a safety arm receiver.
Figure 20:
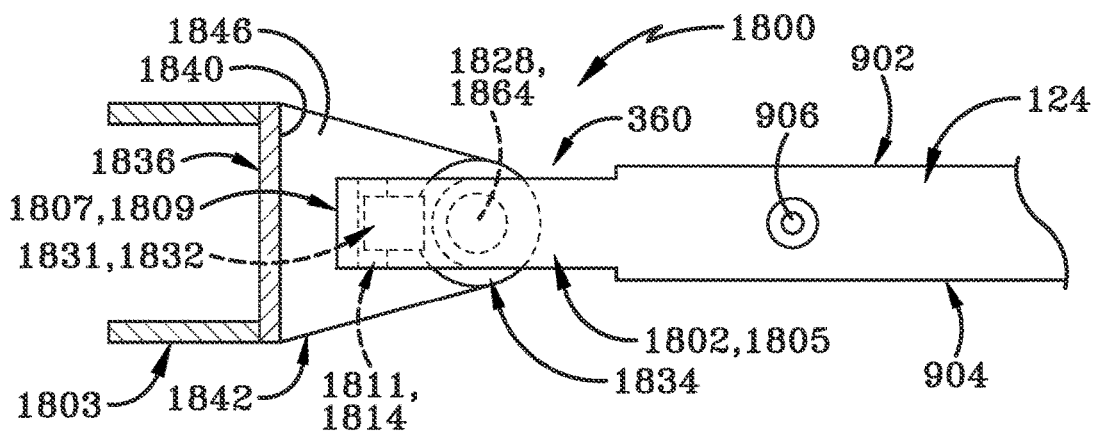
FIG. 20 is a top view of the safety arm coupled to a safety arm receiver as depicted in FIG. 19 along the line 20-20.

FIGS. 19 and 20 depict the coupler 1802 coupled to the safety arm receiver 1803. When the safety arm receiver 1803 is coupled to coupler 1802, the second surface 1850, rounded surface 1852, and the third surface 1854 of the safety arm receiver 1803 nest within the opening 1830 of the coupler 1802. In this position, second surface 1850 of the safety arm receiver 1803 abuts the fourth surface 1814 of the coupler 1802 and the third surface 1854 of the safety arm receiver 1803 abuts the sixth surface 1818 of the coupler 1802. Furthermore, when the coupler 1802 is coupled to the safety arm receiver 1803, the hemispherical member 1828 of the coupler 1802 nests within and abuts the hemispherical surface 1864 of the safety arm receiver 1803.

Figure 21:
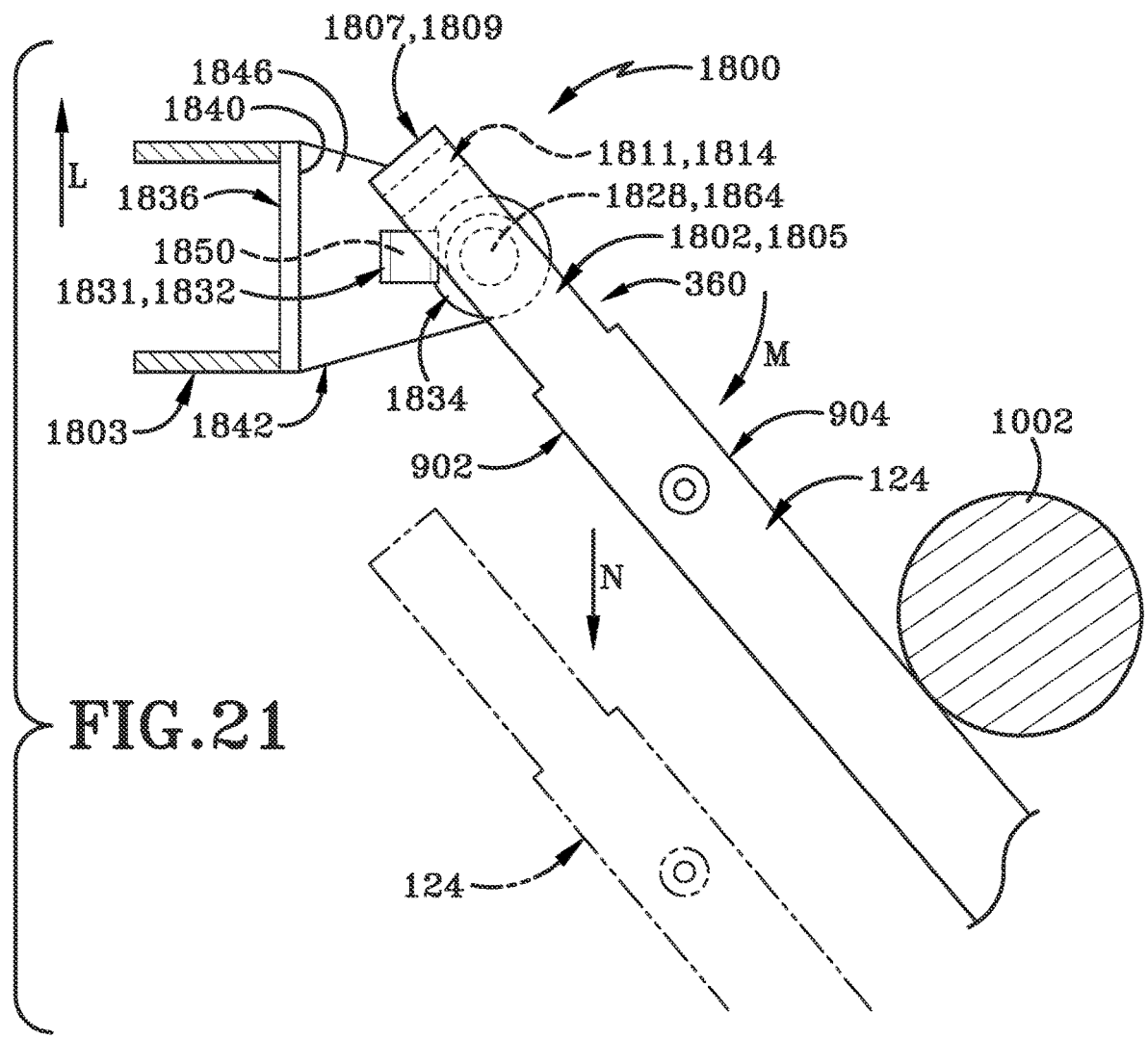
FIG. 21 is a top view of the safety arm and safety arm receiver depicted in FIG. 19 along the line 20-20 contacting an object.

FIG. 21 depicts a safety arm 124 with the coupler 1802 contacting the object 1002. When the vehicle 100 moves in the direction of arrow L and the object 1002 contacts the safety arm 124, a force is applied to the safety arm 124 causing the safety arm 124 rotate in the direction of arrow M. When the safety arm 124 is in the position depicted in FIG. 21 and the vehicle 100 continues to move in the direction of arrow L, the safety arm 124 moves in the direction of arrow N and detaches or decouples from safety arm receiver 1803. When decoupled, the safety arm 124 and the coupler 1802 fall away from the vehicle 100 without damaging the vehicle 100. In this embodiment, the safety arm 124 may be undamaged and the safety arm 124 may be recoupled to the safety arm receiver 1803.

Figure 22:
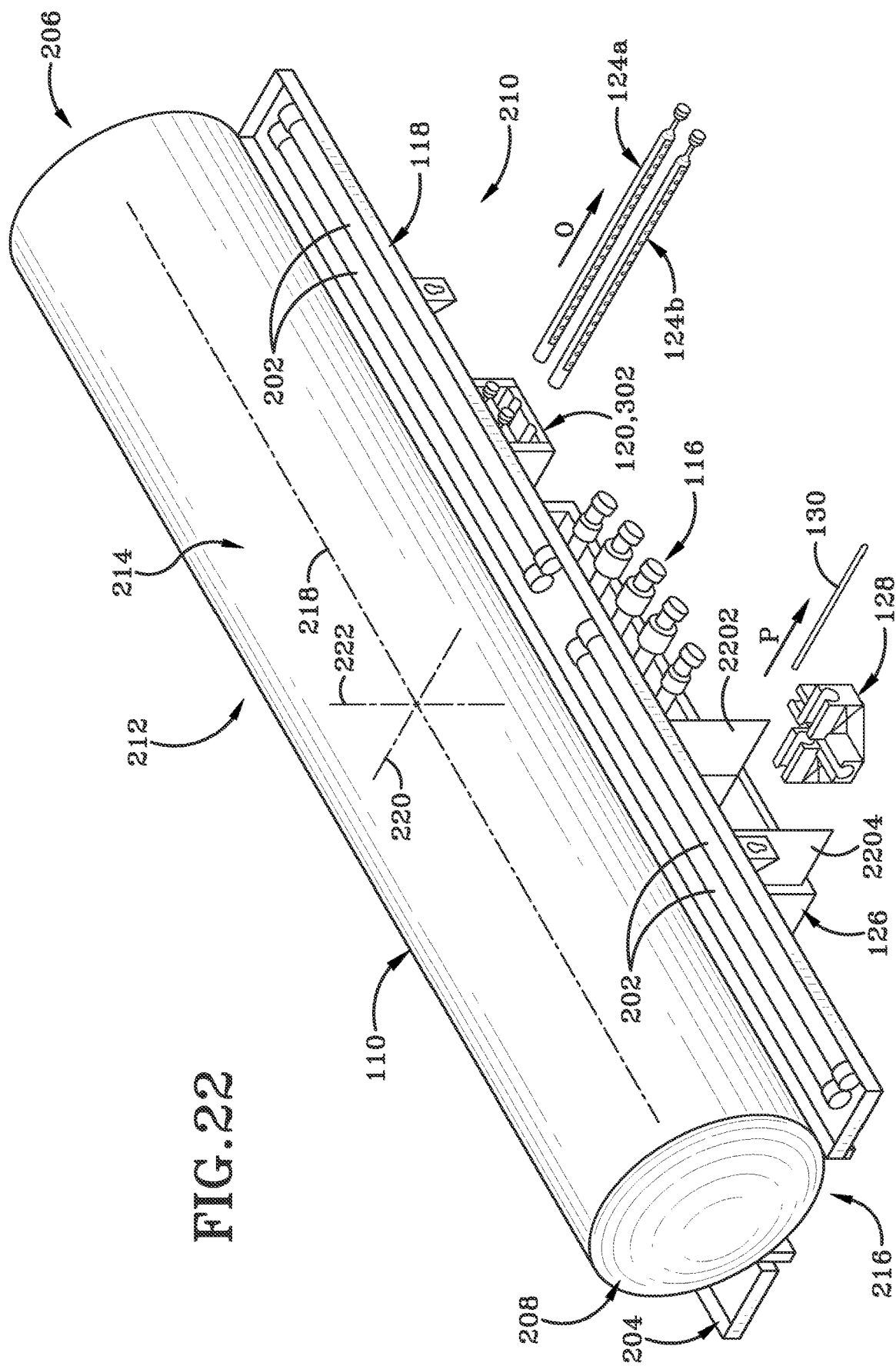
FIG. 22 is a side view of a trailer with members of a safety device removed from the trailer.

FIG. 22 depicts a first safety arm 124a, a second safety arm 124b, the bracket 128, and the bracket support 130 being removed from the vehicle 100. In order to remove the first safety arm 124a and the second safety arm 124b, the first safety arm 124a and the second safety arm 124b are moved in the direction of arrow O. In order to remove the bracket 128 and the bracket support 130 from the bracket holder 126, first a first door 2202 and a second door 2204 are opened and then the bracket 128 and the bracket support 130 are moved in the direction of arrow P and removed from the bracket holder 126.

Figure 23:
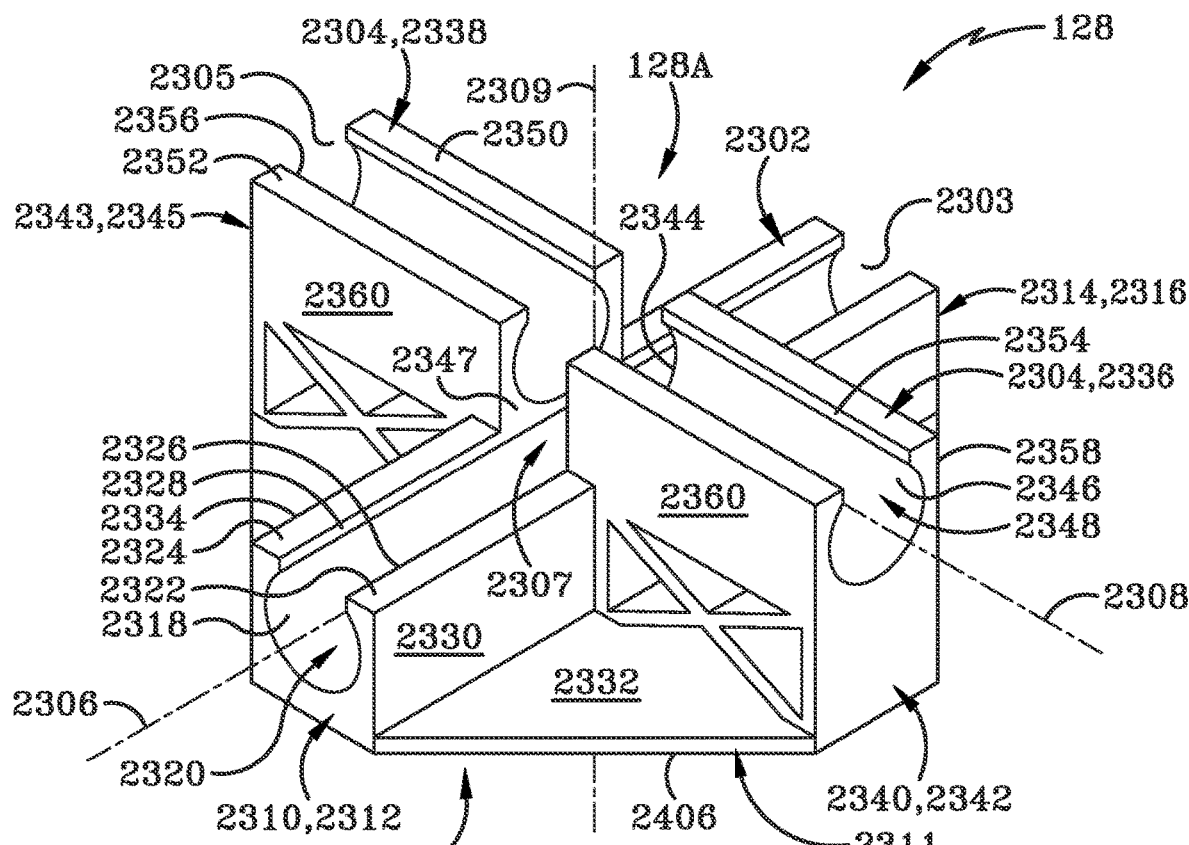
FIG. 23 is a side view of a bracket of a safety device.

FIG. 23 depicts the bracket 128. The bracket 128 includes a first side 128A, a second side 128B opposite the first side 128A, a first safety arm holder 2302 and a second safety arm holder 2304. The first safety arm holder 2302 extends generally parallel to a first horizontal axis 2306 and the second safety arm holder 2304 extends generally parallel to a second horizontal axis 2308. The first horizontal axis 2306 and the second horizontal axis 2308 intersect a central vertical axis 2309 at right angles. Stated another way, the first horizontal axis 2306 and the second horizontal axis 2308 are perpendicular to the central vertical axis 2309. The first safety arm holder 2302 extends generally perpendicular to the second safety arm holder 2304.

The bracket 128 is octagonal in shape. A first surface 2310 of the first safety arm holder 2302 defines a first side 2312 of the bracket 128. A second surface 2314 opposite the first surface 2310 defines a second side 2316 of the first safety arm holder 2302. The first side 2312 of the bracket 128 is opposite the second side 2316 of the bracket 128. A semi-circular surface 2318 extends from the first surface 2310 to the second surface 2314 of the first safety arm holder 2302 and defines a channel 2320. As will be discussed in further detail below, the channel 2320 may retain a safety arm 124.

The first surface 2310 and the second surface 2314 extend longitudinally relative to the central vertical axis to a third surface 2322 and a fourth surface 2324 of the first safety arm holder 2302. The third surface 2322 extends to fifth surface 2326 of the first safety arm holder 2302 and the fourth surface 2324 extends to a sixth surface 2328 of the first safety arm holder 2302. The fifth surface 2326 and the sixth surface 2328 define an opening 2303 of the first safety arm holder 2302. The fifth surface 2326 and the sixth surface 2328 extend to the semi-circular surface 2318. The bracket 128 further includes a base wall 2311. The base wall 2311 includes a first surface 2332. A seventh surface 2330 of the first safety arm holder 2302 extends longitudinally relative to the central vertical axis 2309 from the first surface to the third surface 2322. An eighth surface 2334 extends from the first surface 2332 to the fourth surface 2324. The first surface 2310, the second surface 2314, the fifth surface 2326, the sixth surface 2328, the seventh surface 2330, and the eighth surface 2334 extend generally perpendicular to the first horizontal axis 2306. The third surface 2322 and the fourth surface 2324 extend generally perpendicular to the first horizontal axis 2306.

The second safety arm holder 2304 includes a first portion 2336, a structurally identical second portion 2338, and an opening 2307 between the first portion 2336 and the second portion 2338. The first portion 2336 includes a first surface 2340. The first surface 2340 defines a third side 2342 of the bracket 128 and the second portion 2338 includes a first surface 2343 that define a fourth side 2345 of the bracket 128.

The third side 2342 and the fourth side 2345 are approximately 90° offset from the first side 2312 and the second side 2316 relative to the central vertical axis 2309. The first portion 2336 further includes a second surface 2344 opposite the first surface 2340. A semi-circular surface 2346 extends from the first surface 2340 to the second surface 2344 of the second safety arm holder 2304 and defines a channel 2348. The channel 2348 extends from the first surface 2340 of the first portion 2336 to the first surface 2343 of the second portion 2338. As will be discussed in further detail below, the channel 2348 may retain a safety arm 124. The semi-circular surface 2346 is vertically above the third surface 2322 and the fourth surface 2324 of the first safety arm holder 2302 relative to the central vertical axis 2309.

The first surface 2340 of the first portion 2336 and the second surface 2344 of the first portion 2336 extend longitudinally relative to the central vertical axis 2309 to a third surface 2350 and a fourth surface 2352 of the second safety arm holder 2304. Furthermore, the first surface 2343 of the second portion 2338 and the second surface 2347 of the second portion 2338 extend to the third surface 2350 and the fourth surface 2352. The third surface 2350 extends to fifth surface 2354 of the second safety arm holder 2304 and the fourth surface 2352 surface extends to a sixth surface 2356 of the second safety arm holder 2304. The fifth surface 2354 and the sixth surface 2356 extend to the semi-circular surface 2346.

A seventh surface 2358 of the second safety arm holder 2304 extends longitudinally relative to the central vertical axis 2309 from the first surface 2332 of the bracket 128 to the third surface 2350. An eighth surface 2360 that is opposite the seventh surface 2358 extends from the first surface 2332 of the bracket 128 to the fourth surface 2352. The first surface 2340, the second surface 2344, the fifth surface 2354, the sixth surface 2356, the seventh surface 2358, and the eighth surface 2360 extend generally perpendicular to the central vertical axis 2309. The third surface 2322 and the fourth surface 2324 extend generally parallel to the second horizontal axis 2308.

Figure 24:
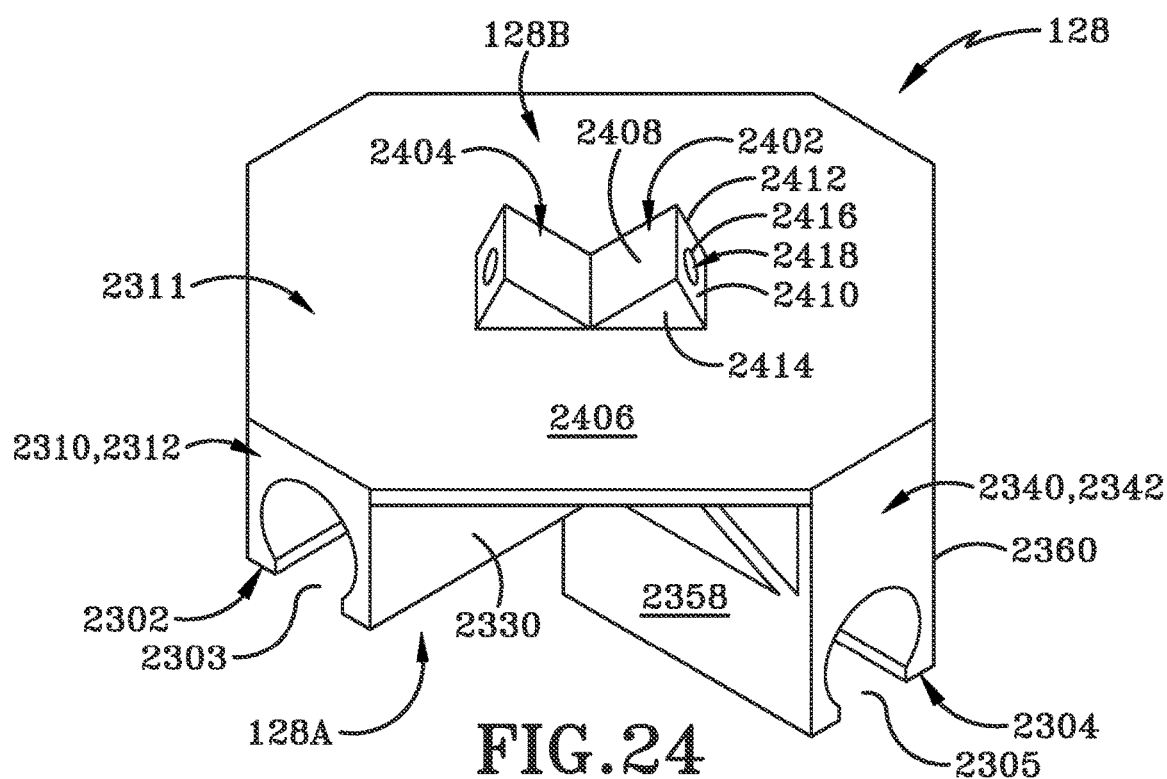
FIG. 24 is a side view of the bracket depicted in FIG. 23 that has been inverted.

FIG. 24 depicts the second side 128B of the bracket 128. The bracket 128 includes a first bracket support holder 2402 and a structurally identical second bracket support holder 2404 that extend longitudinally with respect to the central vertical axis 2309 from a surface 2406 of the bracket 128. Accordingly, for the sake of brevity, only the first bracket support holder 2402 will be discussed in further detail below.

The first bracket support holder 2402 includes a first surface 2408, a second surface 2410, a third surface 2412, and a fourth surface 2414. The first surface 2408 extends at an approximately 45° angle from the surface 2406 to the second surface 2410 and extends between the third surface 2412 and the fourth surface 2414. The second surface 2410 extends at an approximately 45° angle from the surface 2406 to the first surface 2408. The second surface 2410 faces a side of the bracket 128 that is not defined by the first safety arm holder 2302 or the second safety arm holder 2304. The second surface 2410 includes an annular edge 2416 that defines a bracket support receptacle 2418. As will be discussed in further detail below, the bracket support receptacle 2418 may be adapted to receive a bracket support 130. The third surface 2412 and the fourth surface 2414 extend longitudinally relative to the central vertical axis 2309 to the first surface 2408 and the second surface 2410.

Figure 25A:
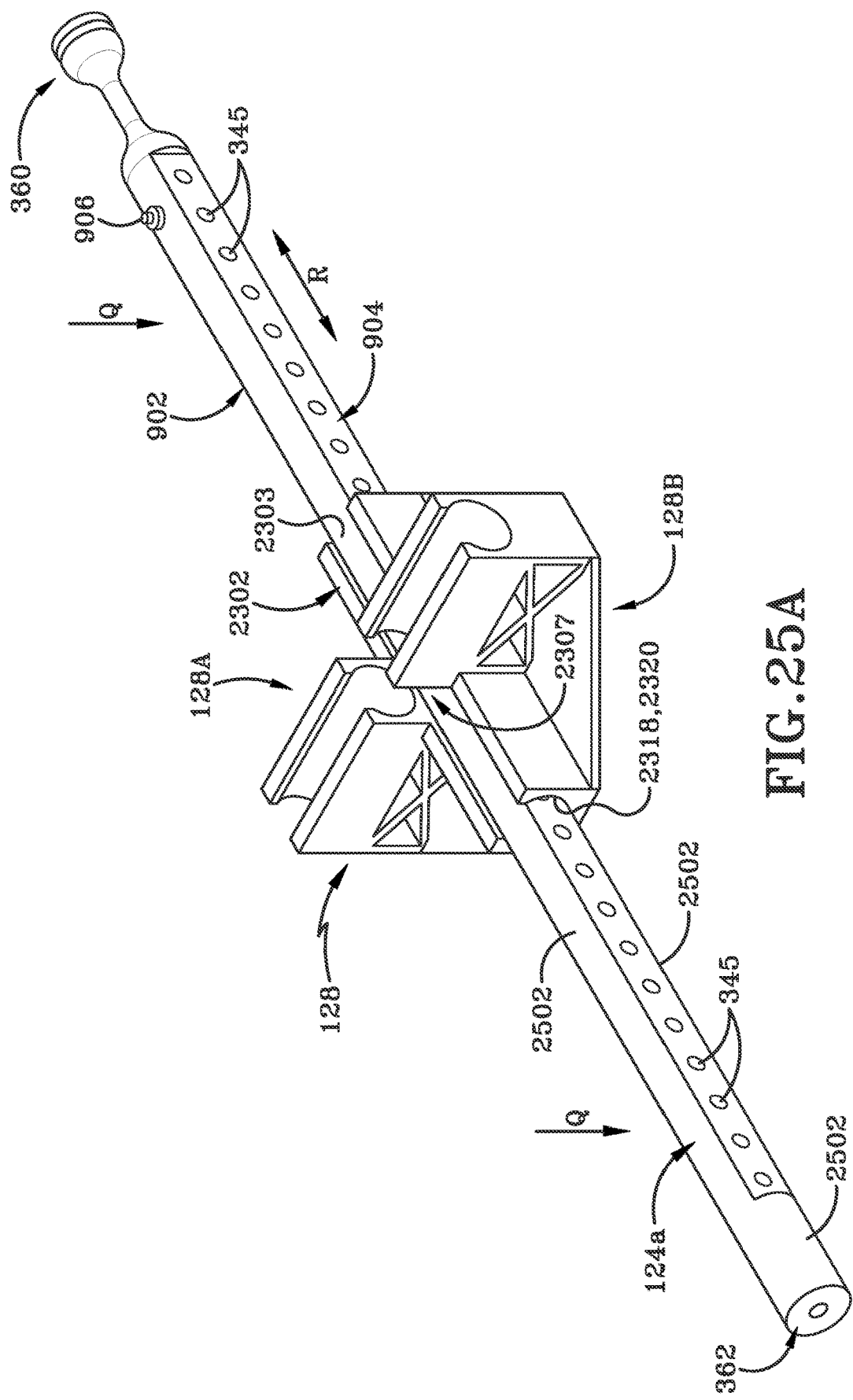
FIG. 25A is a side view of the bracket depicted in FIG. 23 coupled to a safety arm.
Figure 25B:
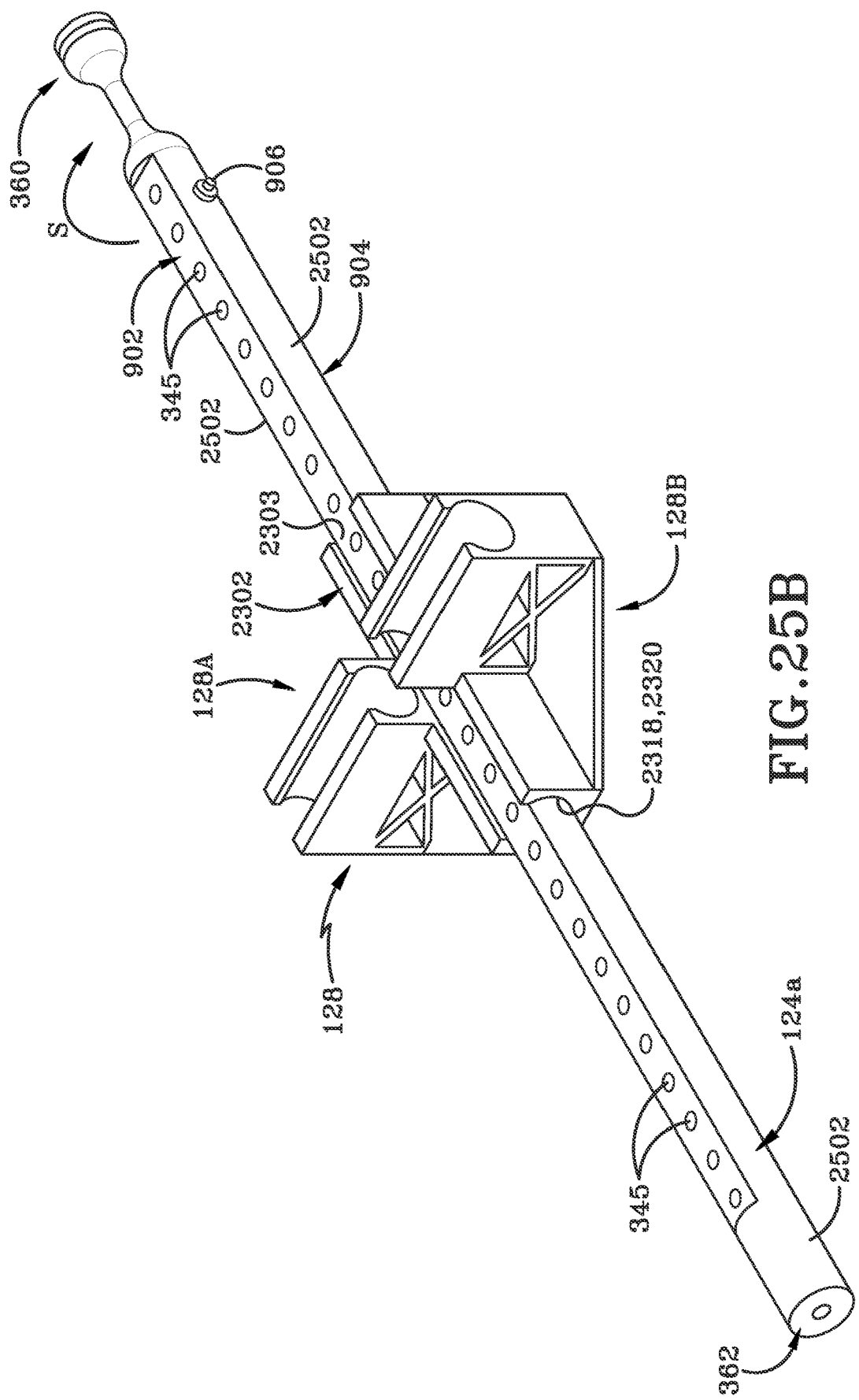
FIG. 25B is a side view of the bracket and safety arm depicted in FIG. 25A wherein the safety arm has been rotated.

FIG. 25A depicts the first safety arm 124a coupled to the bracket 128. In order to couple the safety arm 124a to the bracket 128, the first safety arm 124a is moved in the direction of arrow Q. A safety arm 124 includes a rounded surface 2502 that extends between the first side 902 and the second side 904 of the safety arm 124. A width between opposing sides of the rounded surface 2502 is greater than a width between the first side 902 and the second side 904. Furthermore, the width between opposing sides of the rounded surface 2502 is greater than a width of the opening 2303 and the opening 2307, whereas the with between the first side 902 and the second side 904 is less than a width of the opening 2303 and the opening 2307. Accordingly, when inserting a safety arm 124 into the bracket 128, the safety arm is oriented so that the first side 902 and the second side 904 are parallel to the central vertical axis 2309 allow a safety arm 124 to nest within the first safety arm holder 2302 or the second safety arm holder 2304. The safety arm 124 may be rotated in the direction of arrow S so that the first side 902 and the second side 904 are perpendicular to the central vertical axis 2309 so that the first safety arm holder 2302 and the second safety arm holder 2304 retain a safety arm 124.

Furthermore, a safety arm 124 has a midpoint between the first end 360 and the second end 362. The safety arm 124a may be moved in either direction of arrow R in order to align the midpoint of the safety arm 124a with a center of the bracket 128. As depicted in FIG. 25A, when coupling the safety arm 124a to the bracket 128, the light source 345 may be adjacent to the semi-circular surface 2318.

FIG. 25C depicts the first safety arm 124a and the second safety arm 124b coupled to the bracket 128. The second safety arm 124b is coupled to the bracket 128 in an identical manner as the first safety arm 124a. The safety arm 124b may be moved until the midpoint of the safety arm 124b aligns with the midpoint of the first safety arm 124a. When the first safety arm 124a and the second safety arm 124b are coupled to bracket 128 and the midpoints are aligned with a center of the bracket 128, the first safety arm 124a and the second safety arm 124b form an "X" shape.

Figure 26:
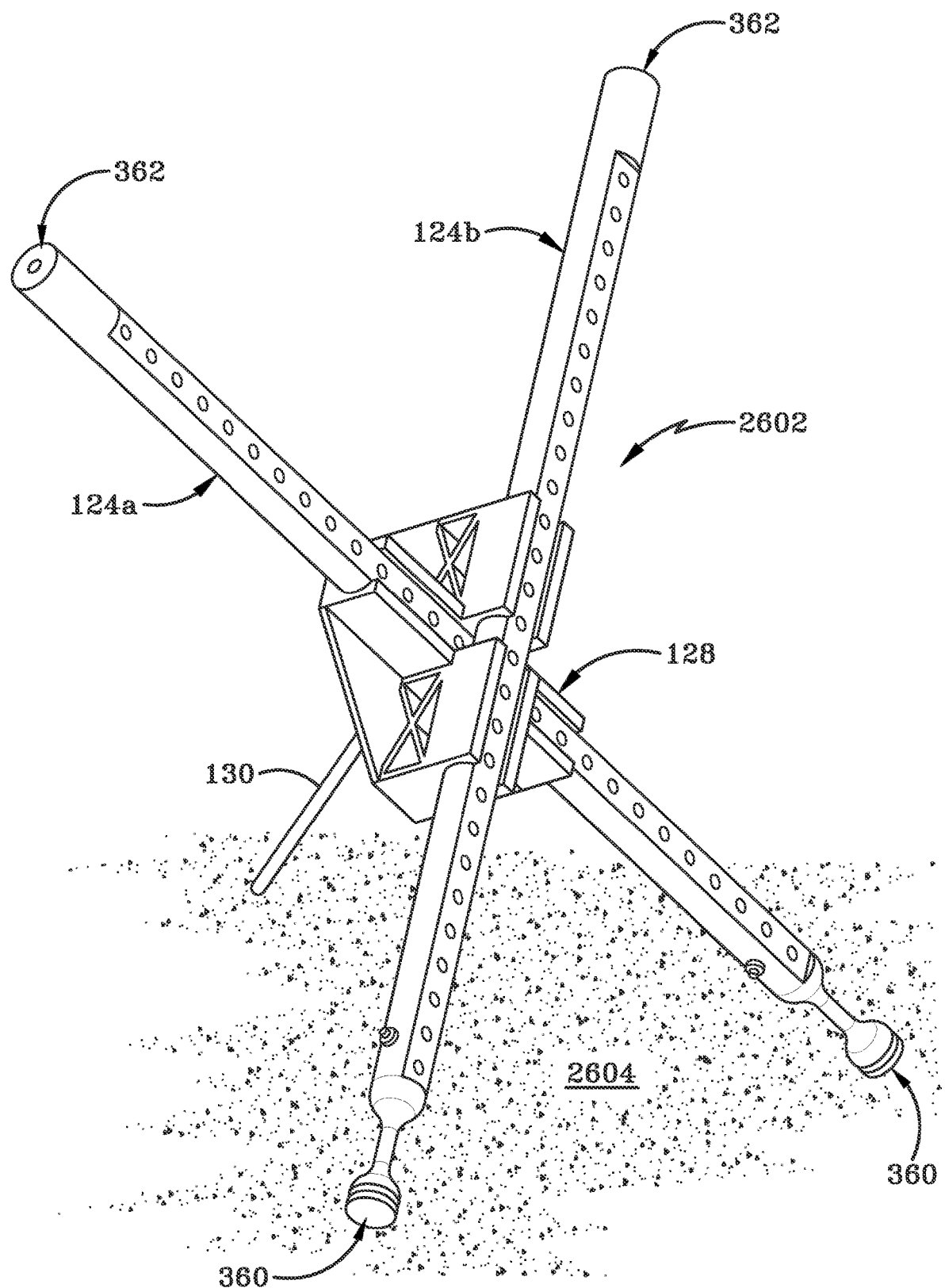
FIG. 26 depicts a safety device formed by the bracket and safety arms depicted in FIG. 25C standing vertically on a surface.

FIG. 26 depicts the bracket 128 coupled to the bracket support 130. In this embodiment, the bracket support receptacle 2418 slidably receives the bracket support 130. The bracket 128, the bracket support 130, the first safety arm 124a, and the second safety arm 124b form a safety device 2602. When assembled, the safety device 2602 may stand vertically on a surface 2604. When standing, the first safety arm 124a, the second safety arm 124b, and the bracket support 130 contact the surface 2604 to support the safety device 2602. While FIG. 26 shows the first end 360 of the first safety arm 124a and the second safety arm 124b, contacting the surface 2604, it is envisioned that the first safety arm 124a and the second safety arm 124b may be rotated 180° so that the second end 362 of the first safety arm 124a and the second safety arm 124b may contact the surface 2604.

Figure 27:
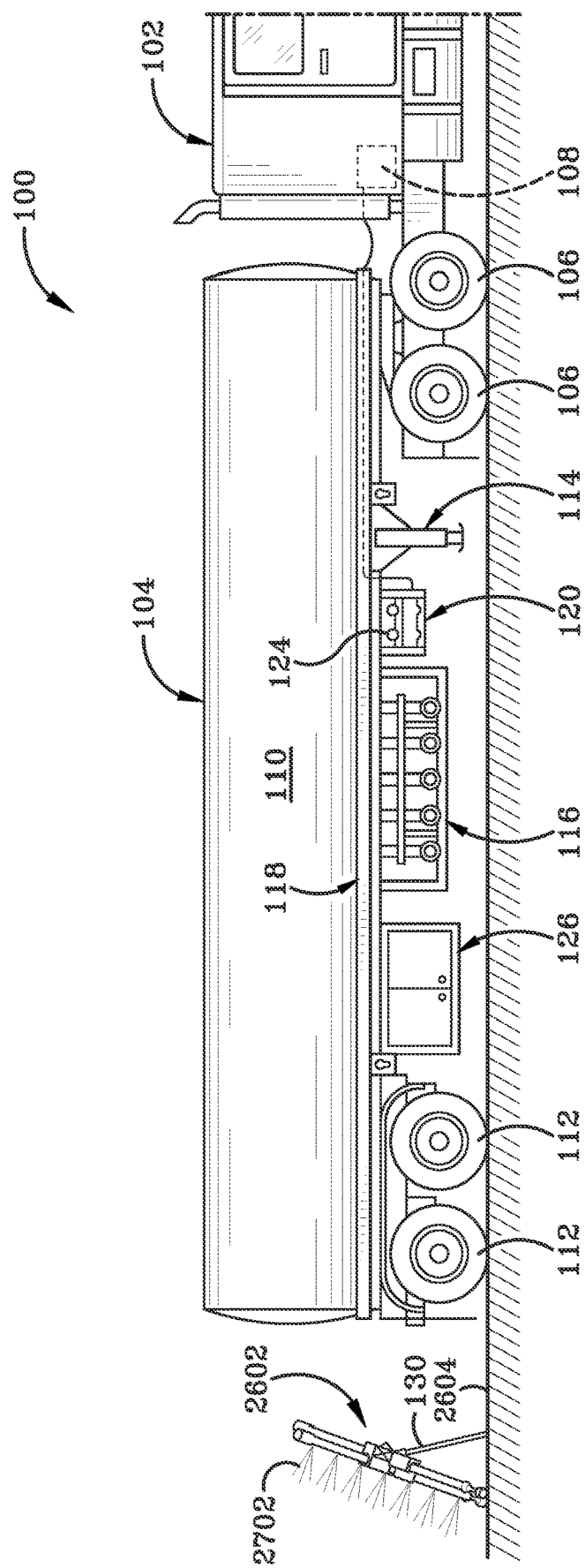
FIG. 27 is a side view of the safety device depicted in FIG. 26 adjacent to a vehicle.

FIG. 27 depicts the safety device 2602 in operation. When in operation, the safety device 2602 may be positioned adjacent to the vehicle 100. In one embodiment, when in operation, the safety device 2602 emits light 2702 from the light source 345 of the first safety arm 124a and the second safety arm 124b. In another embodiment, when in operation, the safety device 2602 does not emit light. While FIG. 27 shows light 2702 emitted from only one side of the safety device 2602 it is envisioned, in an embodiment wherein the safety arms 124a and 124b include a light source 345 on the first side 902 and the second side 904, so that the safety device 2602 may emit light 2702 from multiple sides. In this embodiment, the safety device 2602 may illuminate multiple areas.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A vehicle comprising:
a charging dock provided on the vehicle;
a channel defined by the charging dock;
a power source provided on the vehicle, said power source being in electrical communication with the charging dock;
a first safety arm carried by the vehicle, wherein the first safety arm has a first end and an opposed second end;
wherein the second end of the first safety arm is complementary in configuration to the channel of the charging dock, and the second end of the first safety arm is selectively removably engageable within the channel;
a first battery provided within an interior of the first safety arm, wherein the first battery is placed in electrical communication with the power source via the charging dock when the second end of the first safety arm is engaged within the channel thereof, wherein the power source within the vehicle charges the first battery in the first safety arm via the charging dock; and
a first light source provided on the first safety arm, said first light source being in electrical communication with the first battery, and wherein the first light source is powered by the first battery when the first safety arm is removed from the charging dock.

2. The vehicle of claim 1, wherein the power source charges the first battery while the vehicle is moving.

3. The vehicle of claim 2, further comprising:
a non-transitory computer readable storage medium carried by the vehicle;
instructions stored in the non-transitory computer readable storage medium, that when executed by a processor, execute operations to send electricity from the power source to the first battery only when the vehicle is moving.

4. The vehicle of claim 1, wherein the charging dock includes a charging connector which extends into the charging dock's channel, and wherein the first safety arm includes a charging receptacle that is connected to and is in electrical communication with the charging connector when the second end of the first safety arm is engaged in the channel of the charging dock.

5. The vehicle of claim 1, further comprising:
a receiver connected to the vehicle; and
a coupler on the first safety arm, wherein the coupler couples the first safety arm to the receiver after the first safety arm has been removed from the charging dock.

6. The vehicle of claim 1, wherein the charging dock further defines a second channel, and wherein the vehicle further comprises:
a second safety arm having a first end and a second end, wherein the second end of the second safety arm is complementary to and is selectively removably engageable in the second channel of the charging dock;
a second battery provided within an interior of the second safety arm, wherein said second battery is placed in electrical communication with the power source when the second end of the second safety arm is engaged in the second channel, wherein the power source charges the second battery via the charging dock; and
a second light source is provided on the second safety arm said second light source being in electrical communication with the second battery.

7. The vehicle of claim 6, further comprising:
a first receiver connected to the vehicle;
a second receiver connected to the vehicle;
a first coupler on the first safety arm, wherein the first coupler couples the first safety arm to the first receiver after the first safety arm is removed from the charging dock; and
a second coupler on the second safety arm, wherein the second coupler couples the second safety arm to the second receiver after the second safety arm is removed from the charging dock.

8. The vehicle of claim 6, wherein the charging dock receives the second end of the first safety arm and the second end of the second safety arm simultaneously therein.

9. The vehicle of claim 8, wherein the charging dock includes a first charging connector which extends into the first channel of the charging dock and a second charging connector which extends into the second channel of the charging dock, wherein the first safety arm includes a first charging receptacle that is connected to and in electrical communication with the first charging connector when the first safety arm is engaged in the first channel, and the second safety arm includes a second charging receptacle that is connected to and in electrical communication with the second charging connector when the second safety arm is engaged in the second channel.

10. The vehicle of claim 9, wherein the power source charges the first battery of the first safety arm and the second battery of the second safety arm simultaneously.

11. The vehicle of claim 9, further comprising:
a trailer that carries the first safety arm, the second safety arm, and the charging dock; and
a cab connected to and positioned forward of the trailer.

12. The vehicle of claim 11,
wherein the power source is carried by the cab and is in electrical communication with the charging dock provided on the trailer, wherein the power source charges the first battery in the first safety arm and the second battery in the second safety arm.

13. The vehicle of claim 11, further comprising:
an arm holder carried by the trailer and adjacent to the charging dock, wherein the arm holder carries the first safety arm and the second safety arm.

14. The vehicle of claim 13, wherein the trailer is a cylindrical tank including a nozzle assembly in communication with an interior volume of the cylindrical tank, and the arm holder is adjacent to the nozzle assembly.

15. A method for charging a battery of a safety arm assembly of a vehicle, said method comprising:
decoupling a first safety arm of the safety arm assembly from a charging dock provided on the vehicle, wherein the first safety arm includes a first light source and a first battery in electrical communication with the first light source, and the charging dock places the first safety arm in electrical communication with a power source of the vehicle;
illuminating the first light source on the first safety arm while decoupled from the charging dock;
returning the first safety arm to the charging dock by inserting an end of the first safety arm into a first channel defined by the charging dock;
placing the battery of the first safety arm in electrical communication with the power source via the charging dock; and
charging the battery of the first safety arm via the power source that is electrically connected with the charging dock.

16. The method of claim 15, further comprising after removing the first safety arm from the charging dock,
coupling the first safety arm to the vehicle remote from the charging dock and without maintaining electrical communication between the first light source and the power source on the vehicle.

17. The method of claim 16, further comprising:
decoupling a second safety arm of the arm assembly from the charging dock provided on the vehicle, wherein the second safety arm includes a second light source and a second battery in electrical communication with the second light source, and the charging dock places the second safety arm in electrical communication with the power source;
illuminating the second light source on the second safety arm while decoupled from the charging dock;
returning the second safety arm to the charging dock by inserting an end of the second safety arm into a second channel defined by the charging dock;

placing the battery of the second safety arm in electrical communication with the power source provided on the vehicle via the charging dock; and charging the second battery of the second safety arm with the power source via the charging dock.

18. The method of claim 17, further comprising:

charging the first battery of the first safety arm and the second battery of the second safety arm with the power source that is carried by a cab of the vehicle, where the cab is located forwardly of a cylindrical tank of the vehicle.

19. The method of claim 17, further comprising:

moving the vehicle; and charging the first battery of the first safety arm and charging the second battery of the second safety arm simultaneously while the vehicle is moving.

\* \* \* \* \*